US012030674B2

(12) United States Patent
Licciardello et al.

(10) Patent No.: US 12,030,674 B2
(45) Date of Patent: Jul. 9, 2024

(54) FLUID TRANSFER INTERFACE

(71) Applicant: Altius Space Machines Inc., Broomfield, CO (US)

(72) Inventors: Geoffrey Thomas Licciardello, Denver, CO (US); Jonathan Andrew Goff, Lafayette, CO (US); Calvin James Murphy, Denver, CO (US)

(73) Assignee: Voyager Space IP Holdings, LLC, Denver, CO (US)

( * ) Notice: Subject to any disclaimer, the term of this patent is extended or adjusted under 35 U.S.C. 154(b) by 806 days.

(21) Appl. No.: 17/194,277

(22) Filed: Mar. 7, 2021

(65) Prior Publication Data

US 2021/0284363 A1    Sep. 16, 2021

Related U.S. Application Data

(60) Provisional application No. 62/986,644, filed on Mar. 7, 2020.

(51) Int. Cl.
*B64G 1/64* (2006.01)
(52) U.S. Cl.
CPC .................. *B64G 1/641* (2013.01)
(58) Field of Classification Search
CPC .............................. B64G 1/641; F16L 37/004
USPC .......................................... 244/135 R; 141/1
See application file for complete search history.

(56) References Cited

U.S. PATENT DOCUMENTS

| 3,586,048 | A | * | 6/1971 | Arnold | F16L 37/32 |
| | | | | | 137/614.04 |
| 8,894,847 | B2 | | 11/2014 | Jacobs et al. | |
| 10,006,567 | B2 | | 6/2018 | Zumbrum | |
| 10,486,959 | B2 | | 11/2019 | Zumbrum | |
| 10,647,565 | B2 | | 5/2020 | Zumbrum | |
| 10,773,863 | B2 | | 9/2020 | Zumbrum | |
| 11,084,710 | B1 | * | 8/2021 | Raven | B67D 7/06 |
| 2019/0385772 | A1 | * | 12/2019 | Denham | B63B 21/02 |

* cited by examiner

*Primary Examiner* — Timothy P. Kelly
*Assistant Examiner* — Christopher M Afful
(74) *Attorney, Agent, or Firm* — FisherBroyles LLP; Cara L. Crowley-Weber; Gregory T. Fettig

(57) ABSTRACT

A fluid transfer interface is provided. The fluid transfer interface includes one or more of first and second interface portions. The first interface portion includes a first portion of a fluid connector and one or more ferromagnetic surfaces. The second interface portion includes an extendable second portion of the fluid connector and one or more electropermanent magnets, laterally disposed around the second portion of the fluid connector, configured to be magnetized or demagnetized in unison. The one or more electropermanent magnets are further configured to provide attraction force to the one or more ferromagnetic surfaces when magnetized and couple the first interface portion to the second interface portion and provide no attraction force to the one or more ferromagnetic surfaces when demagnetized and allow the first interface portion to be decoupled from the second interface portion.

20 Claims, 26 Drawing Sheets

Spacecraft Fluid Transfer System

Spacecraft Fluid Transfer System

Fig. 1A  Spacecraft Fluid Transfer System
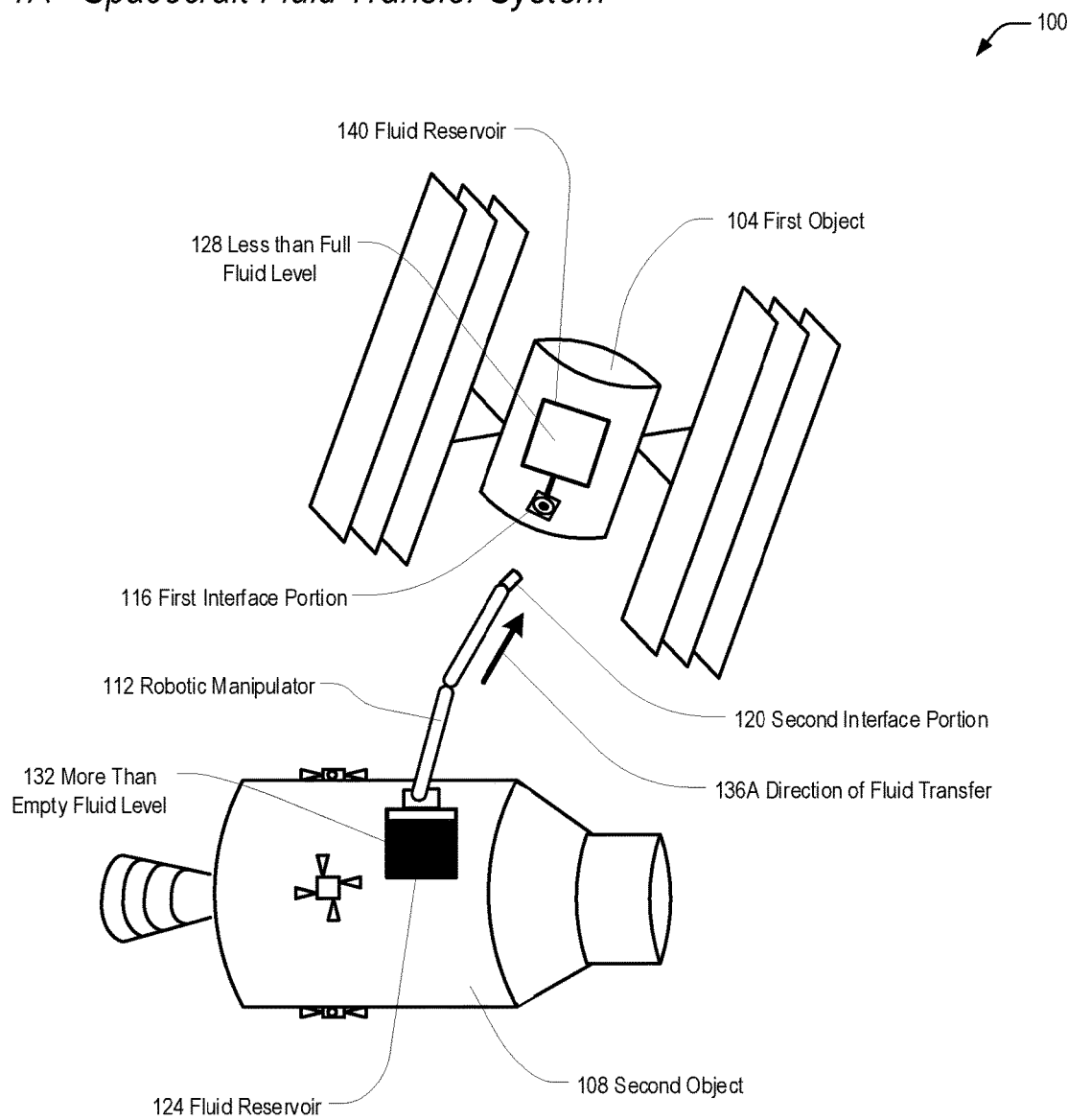

Fig. 1B Spacecraft Fluid Transfer System
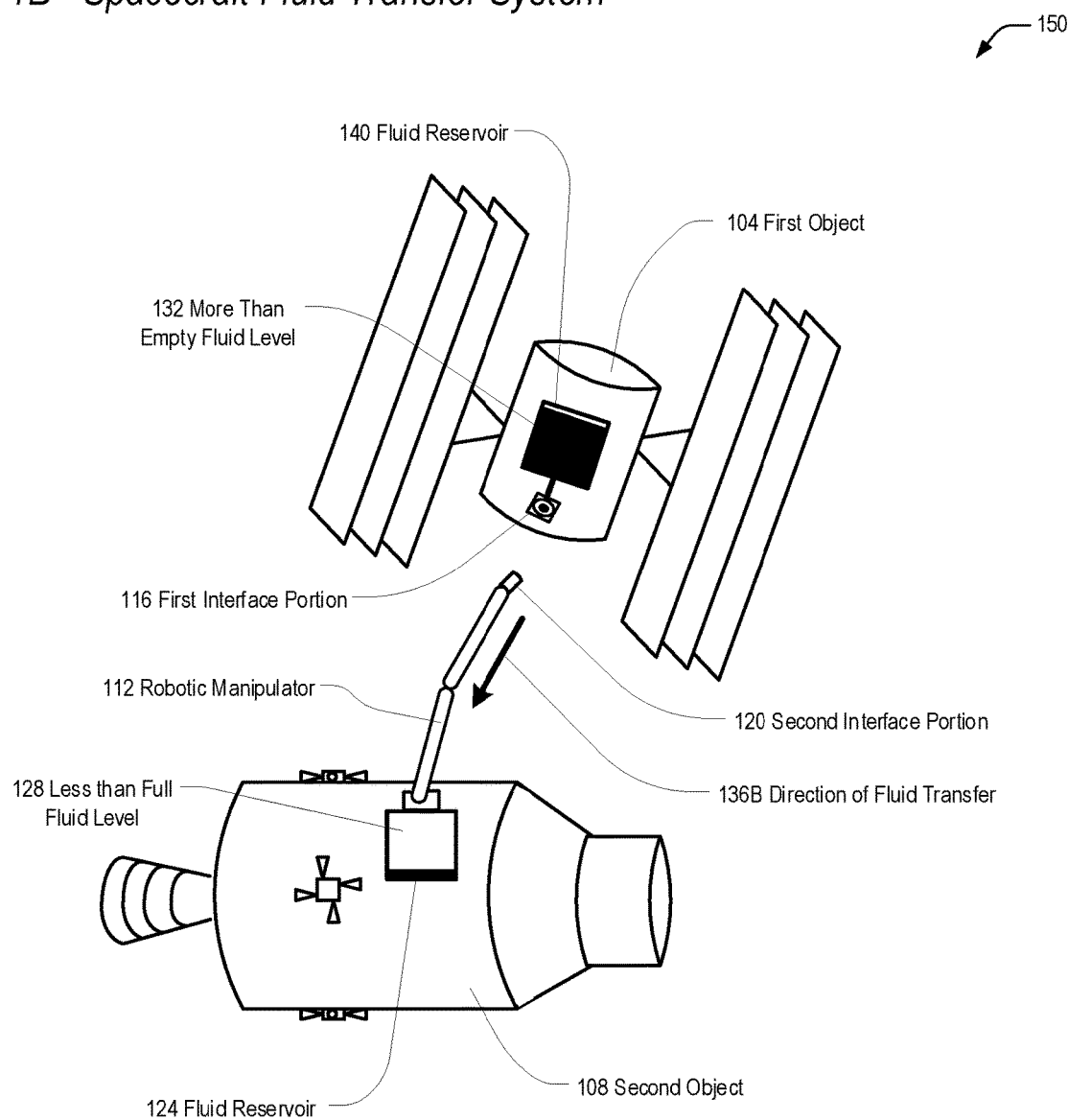

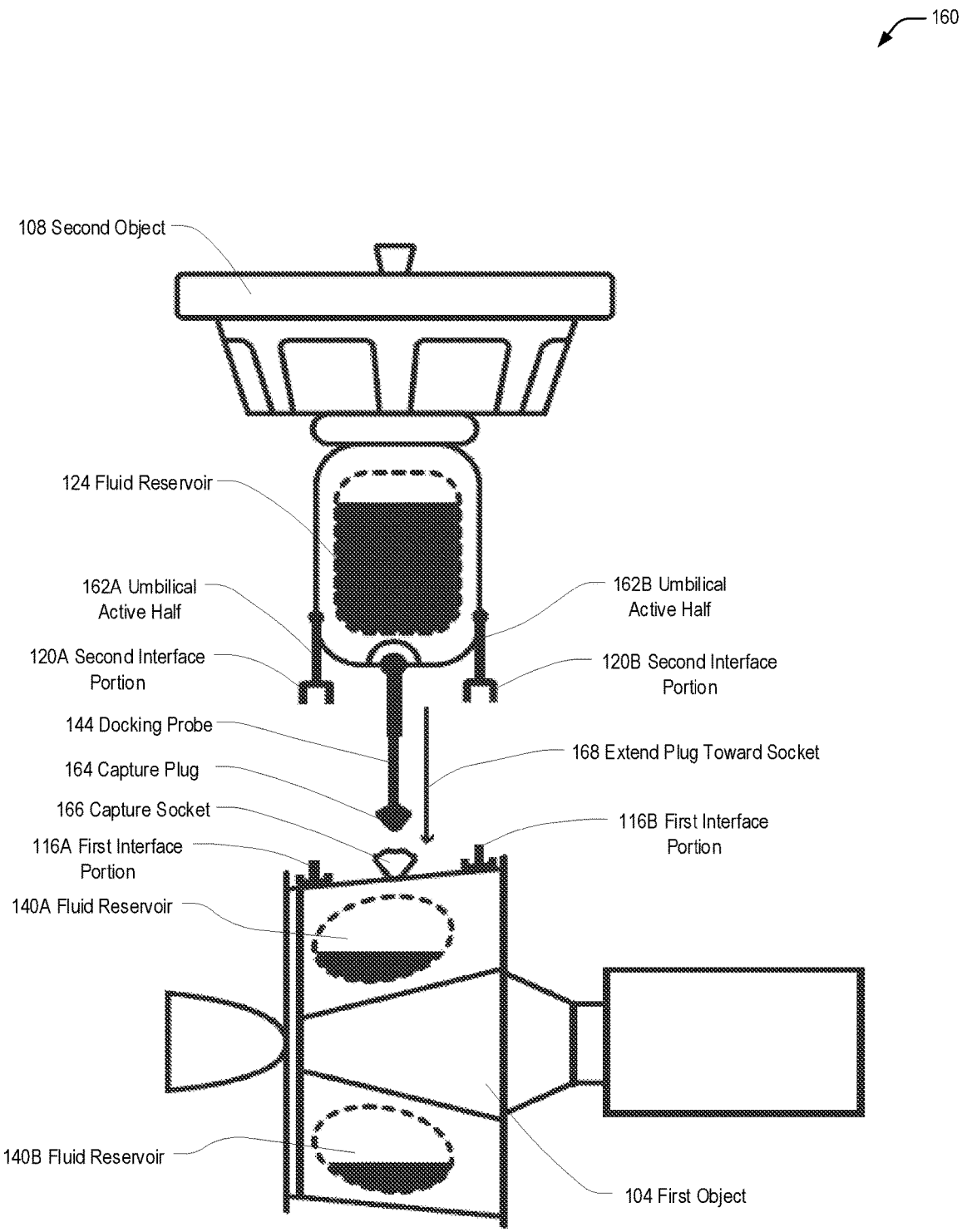
Fig. 1C  Spacecraft Fluid Transfer System

Fig. 1D  Spacecraft Fluid Transfer System
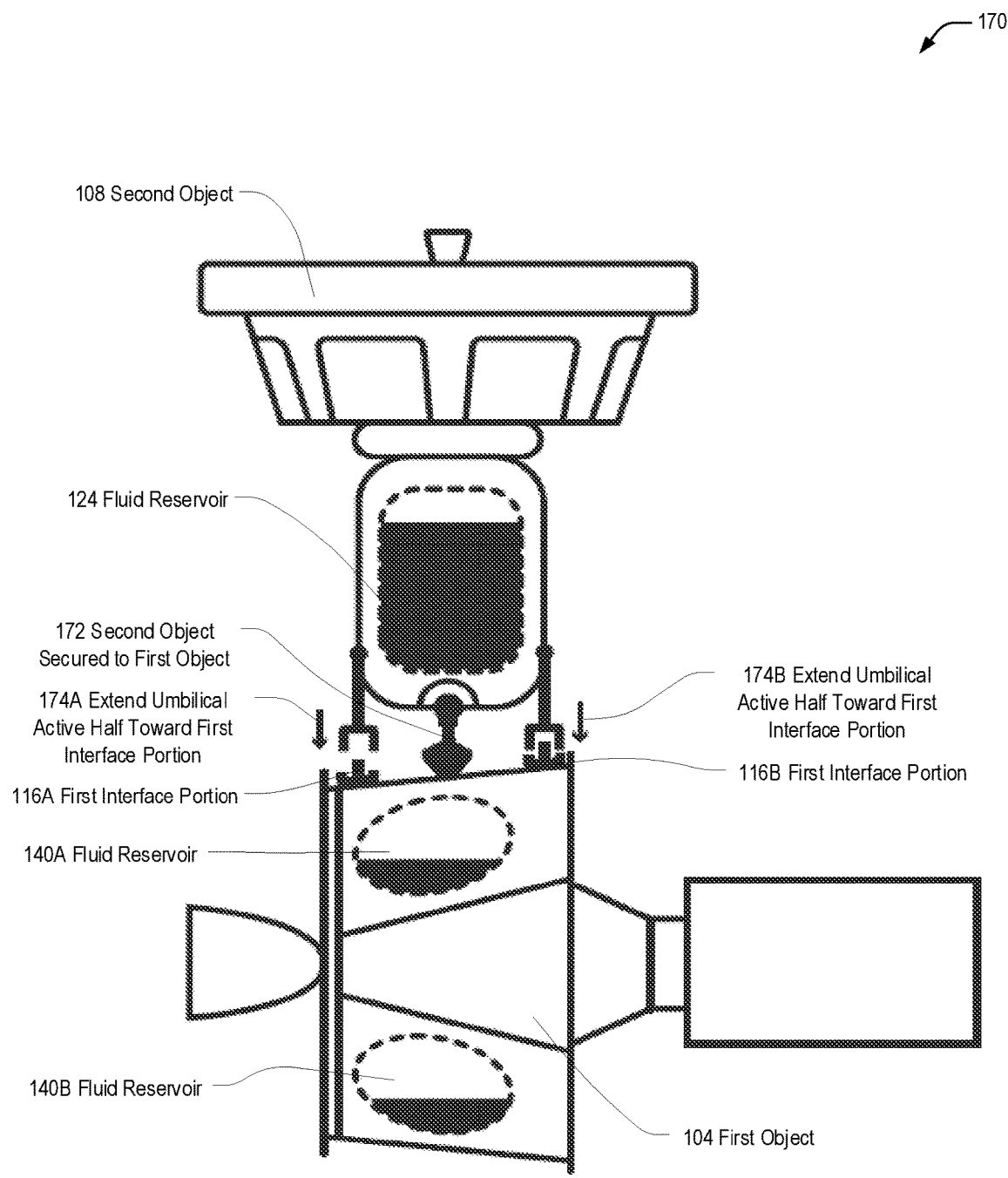

Fig. 1E  Spacecraft Fluid Transfer System
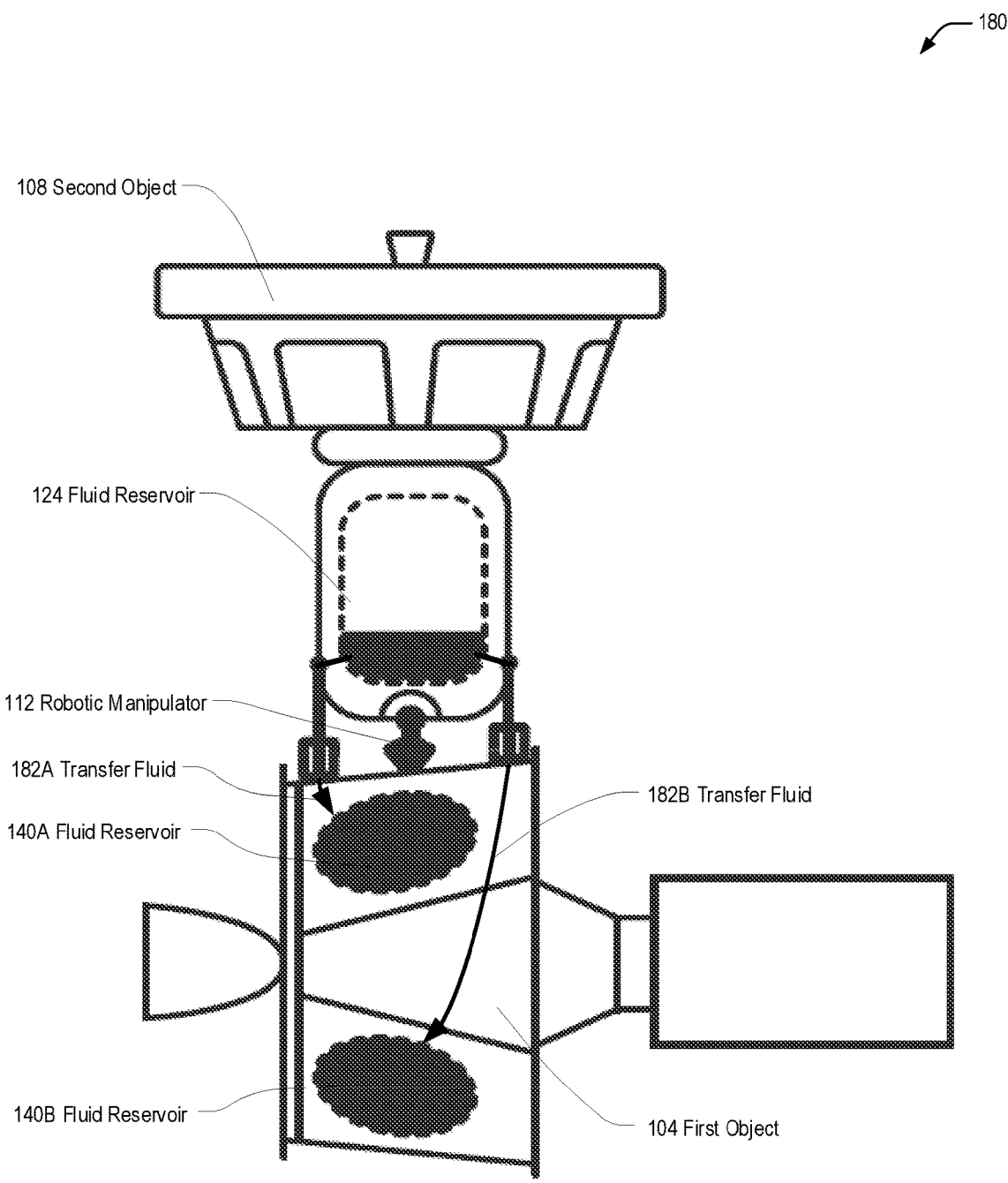

*Fig. 2A   Electropermanent Magnetization*
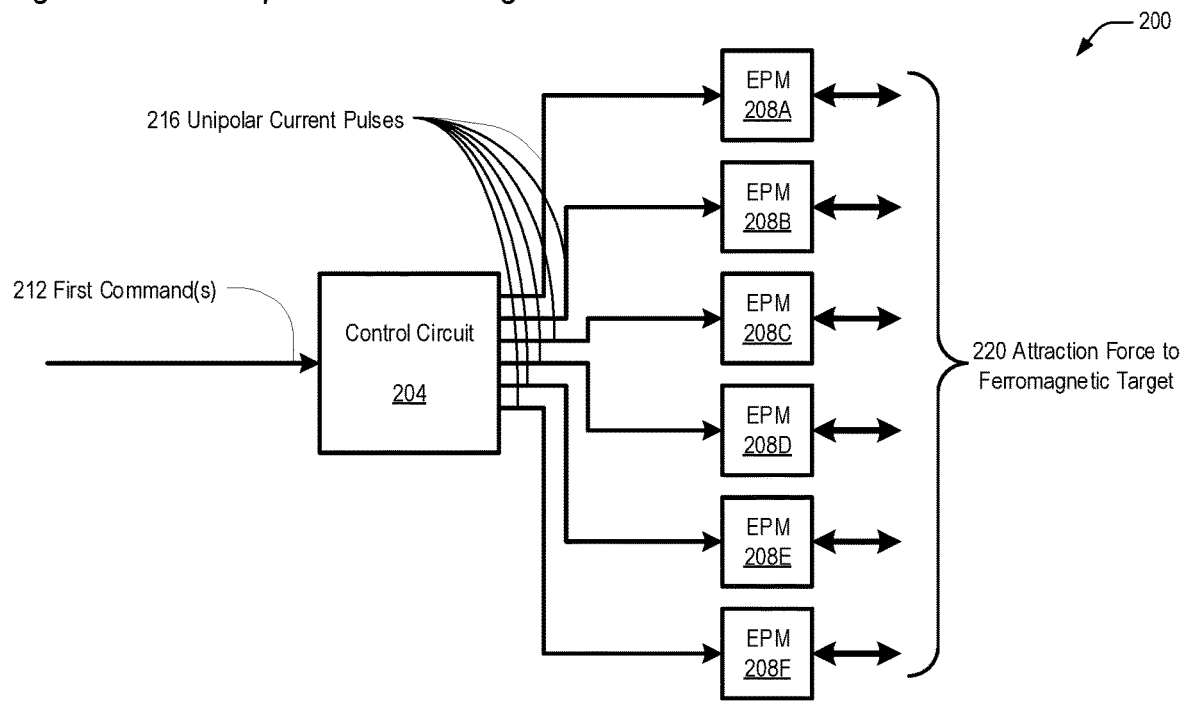
*Fig. 2B   Electropermanent Demagnetization*
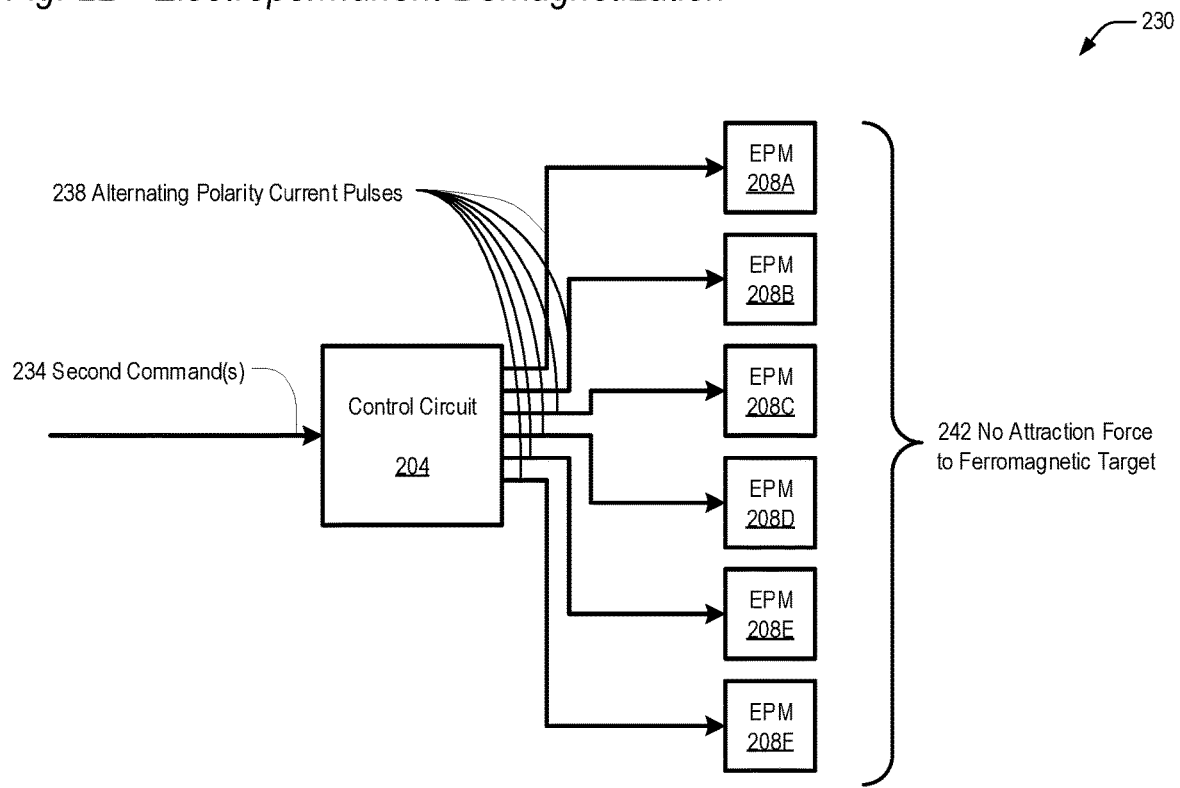

*Fig. 3A First Interface Portion Isometric View*
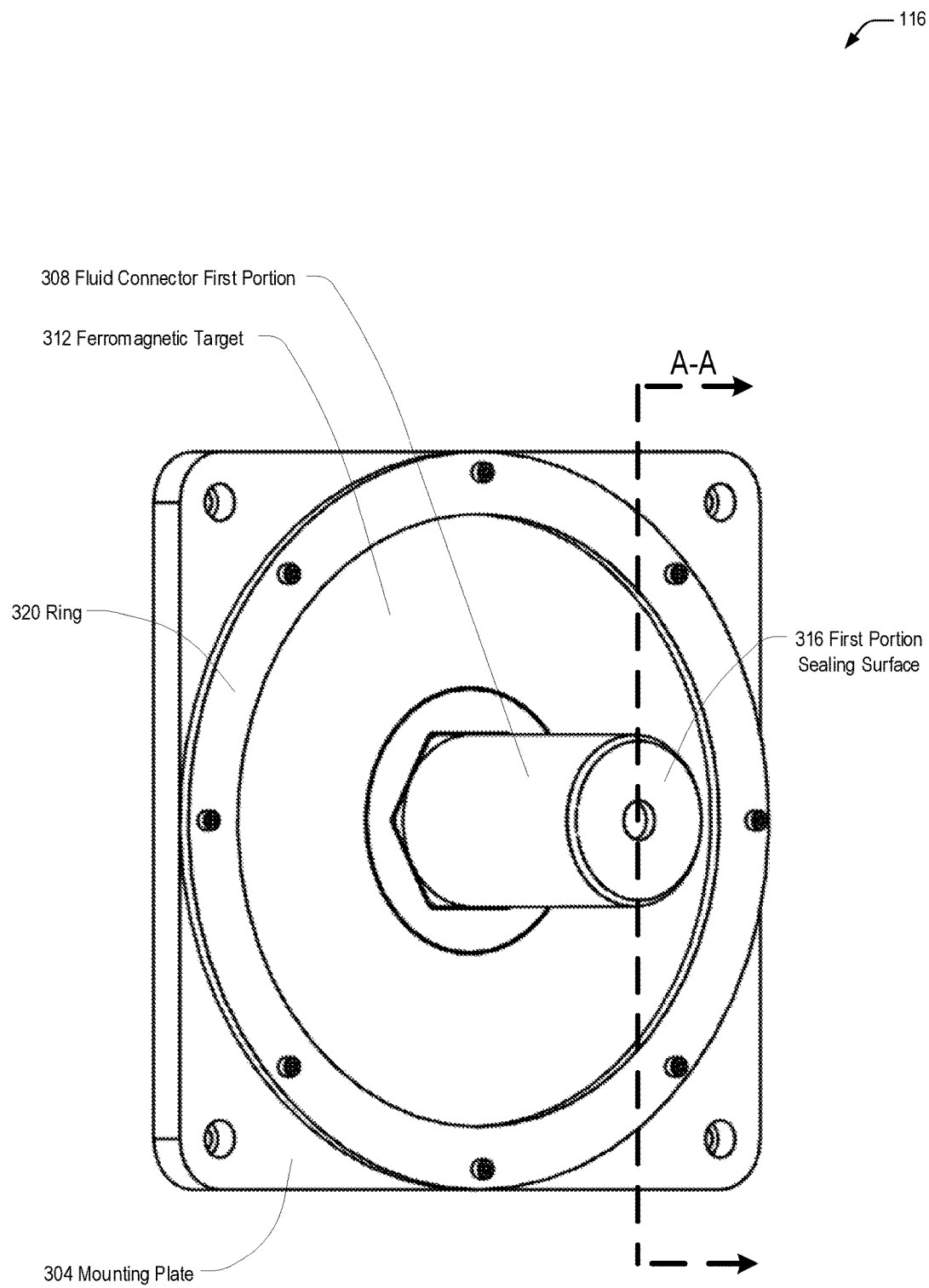

*Fig. 3B First Interface Portion Exploded View*
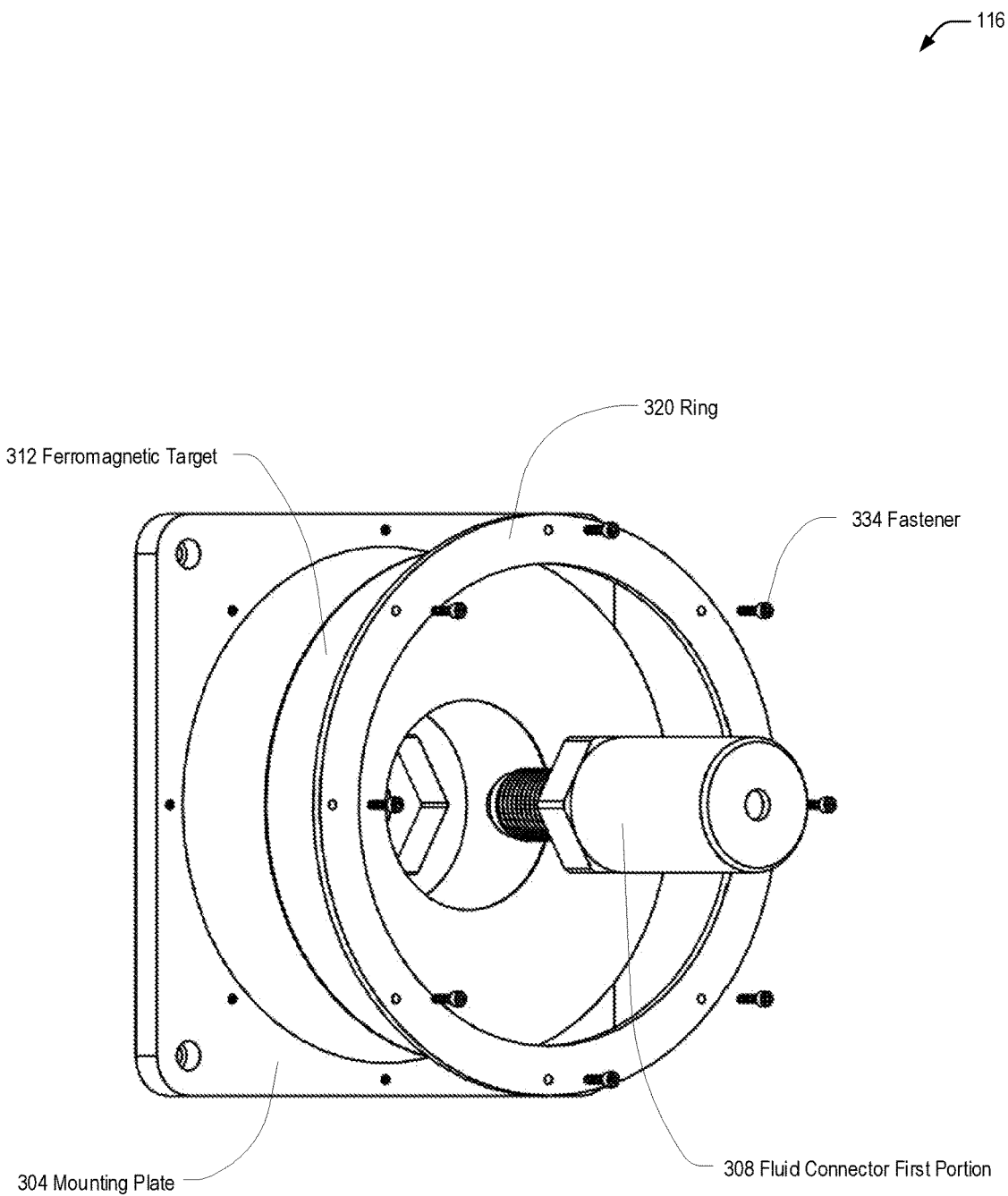

Fig. 3C First Interface Portion Section View A-A
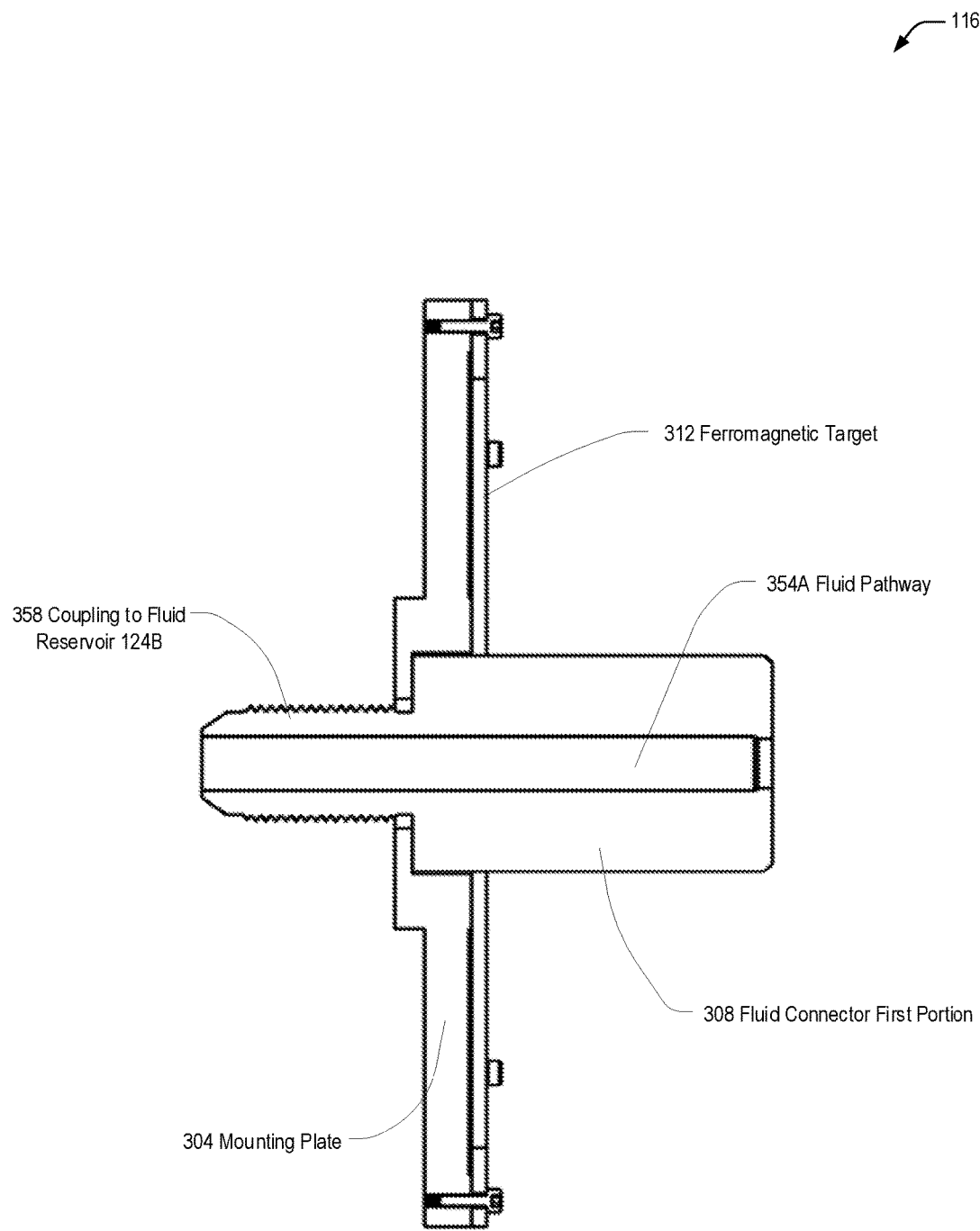

Fig. 4A Second Interface Portion Isometric View
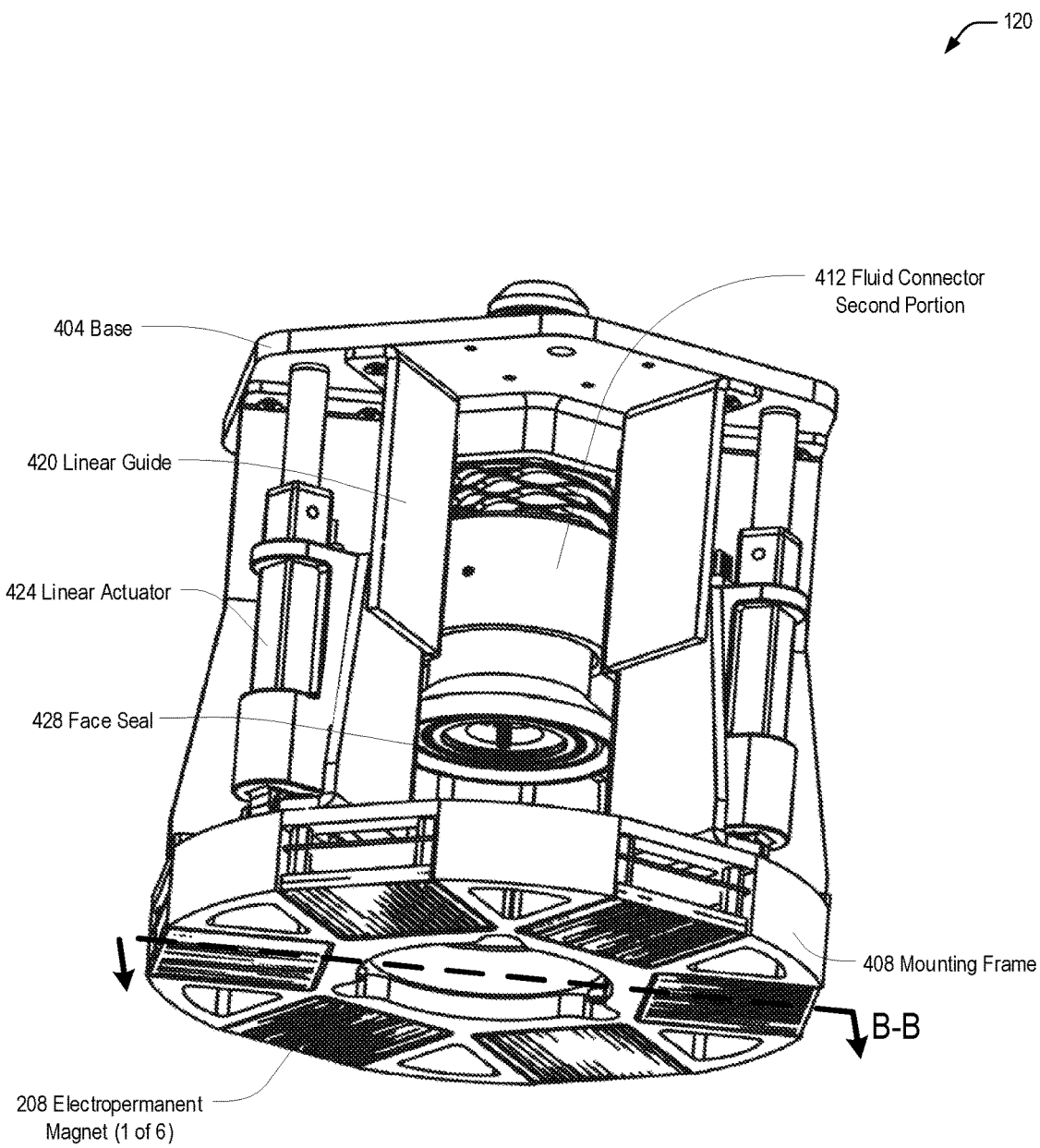

Fig. 4B  Second Interface Portion Exploded View
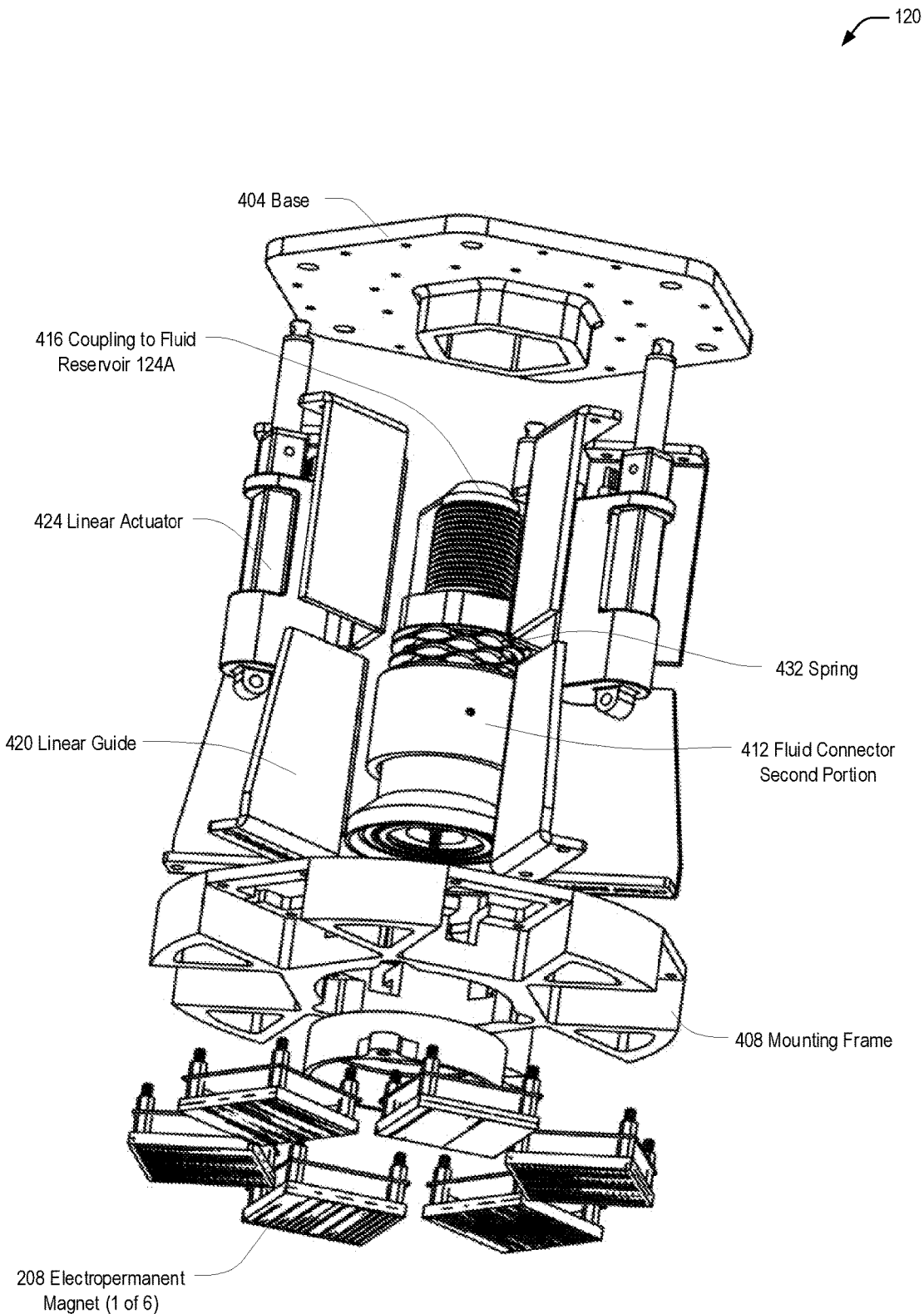

Fig. 4C  Second Interface Portion Side View
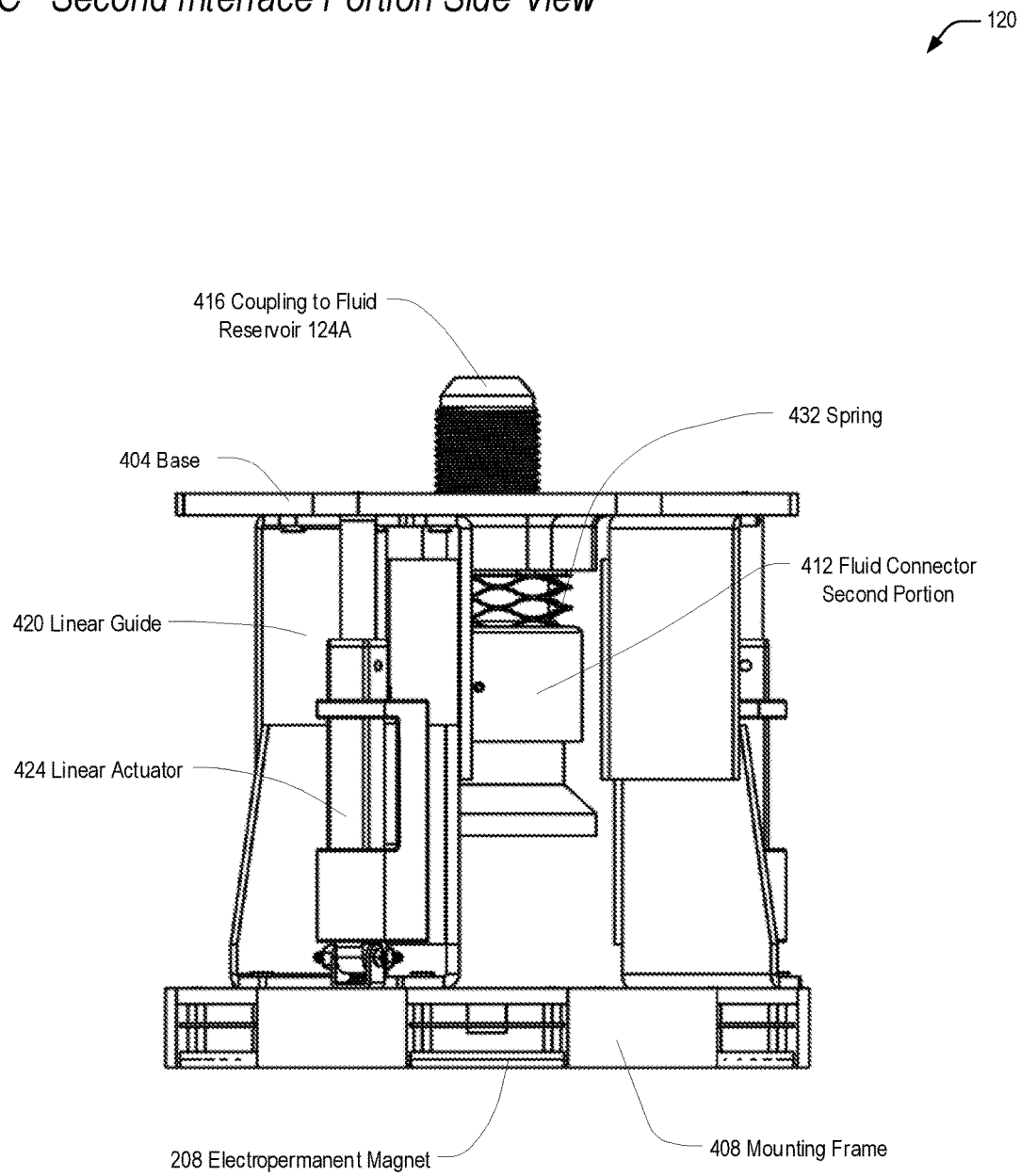

*Fig. 4D   Second Interface Portion Section View B-B*
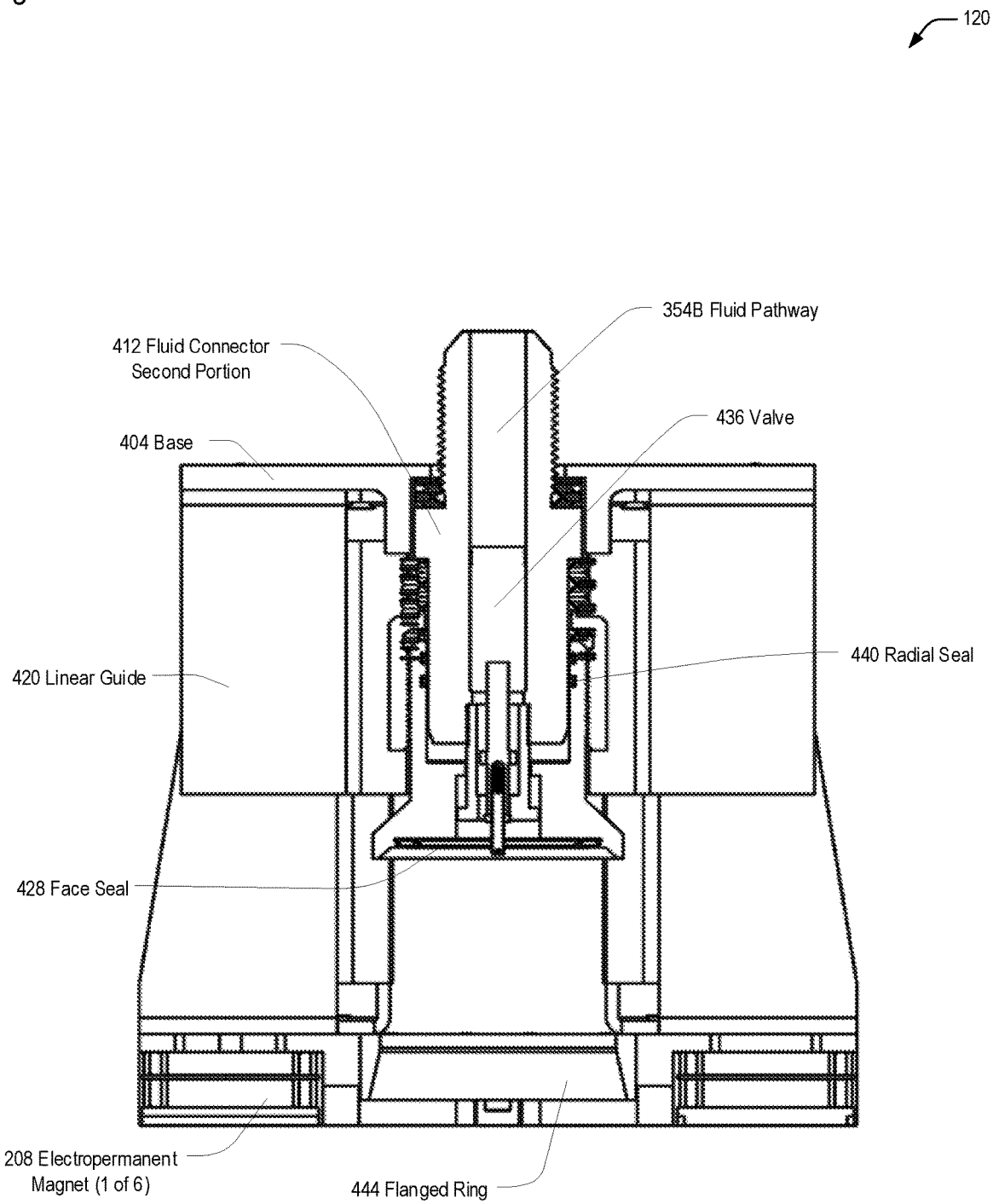

*Fig. 5A Uncoupled Fluid Transfer Interface Isometric View*
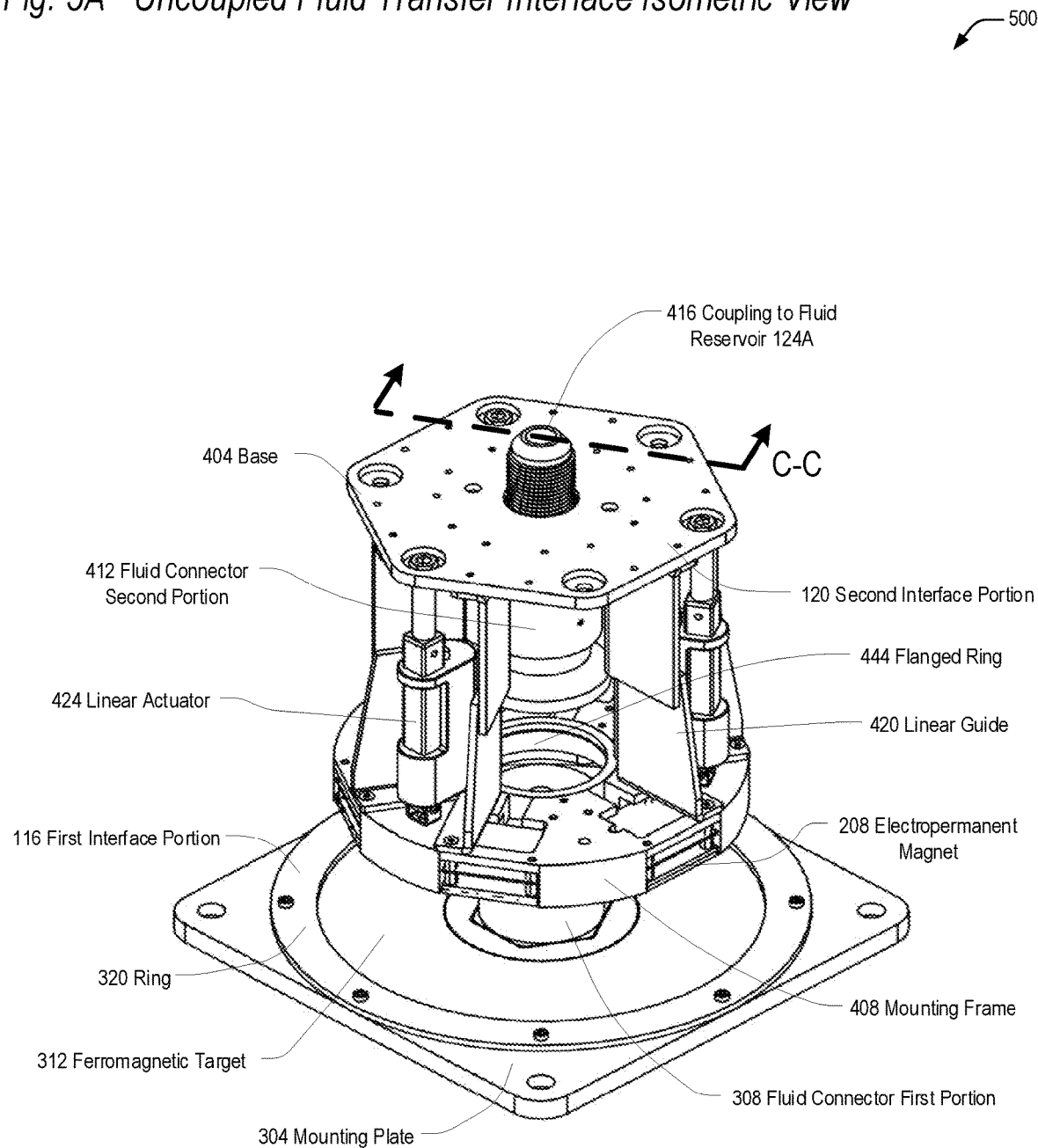

*Fig. 5B Uncoupled Fluid Transfer Interface Section C-C View*
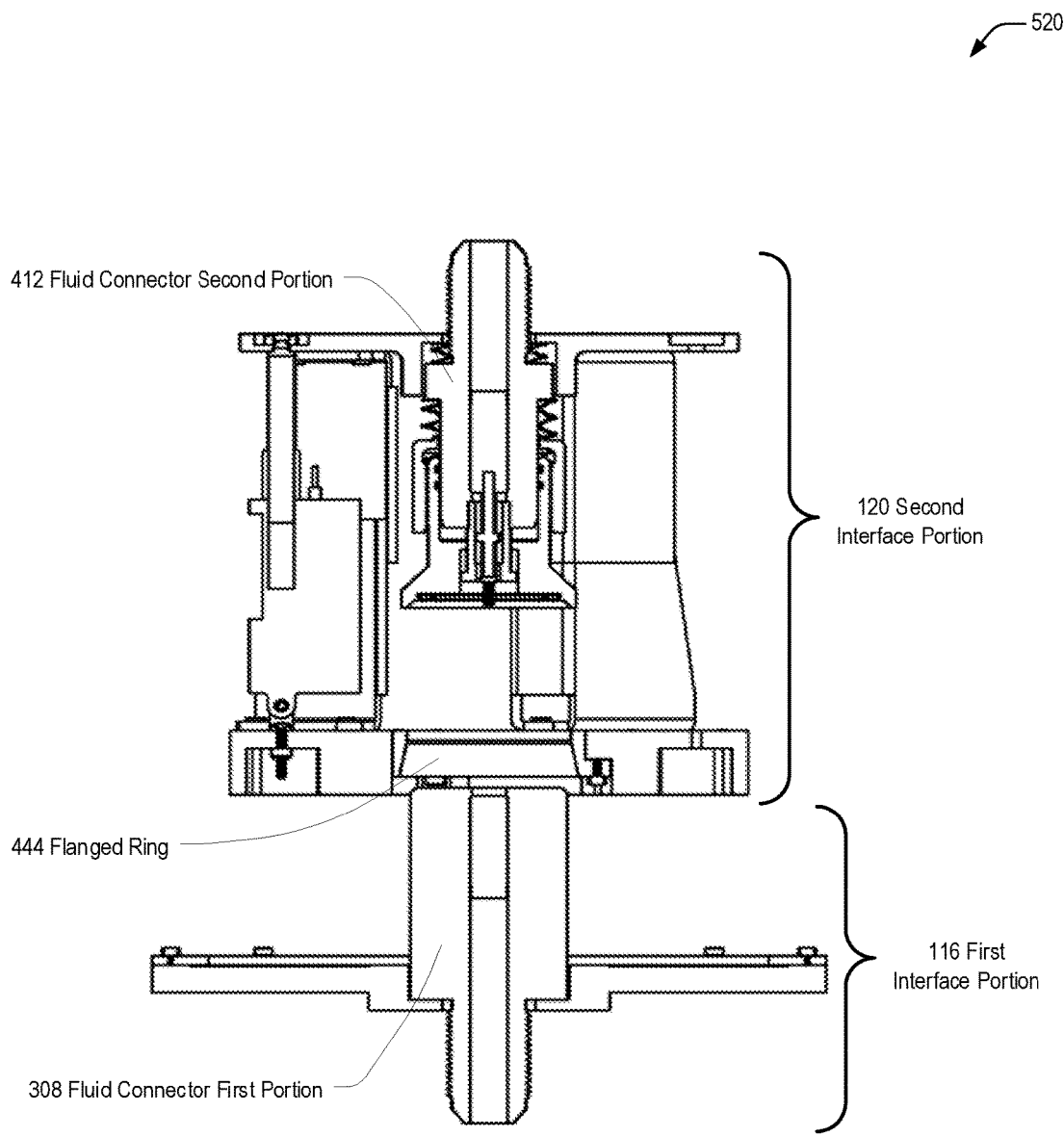

Fig. 6A Coupled Fluid Transfer Interface Isometric View
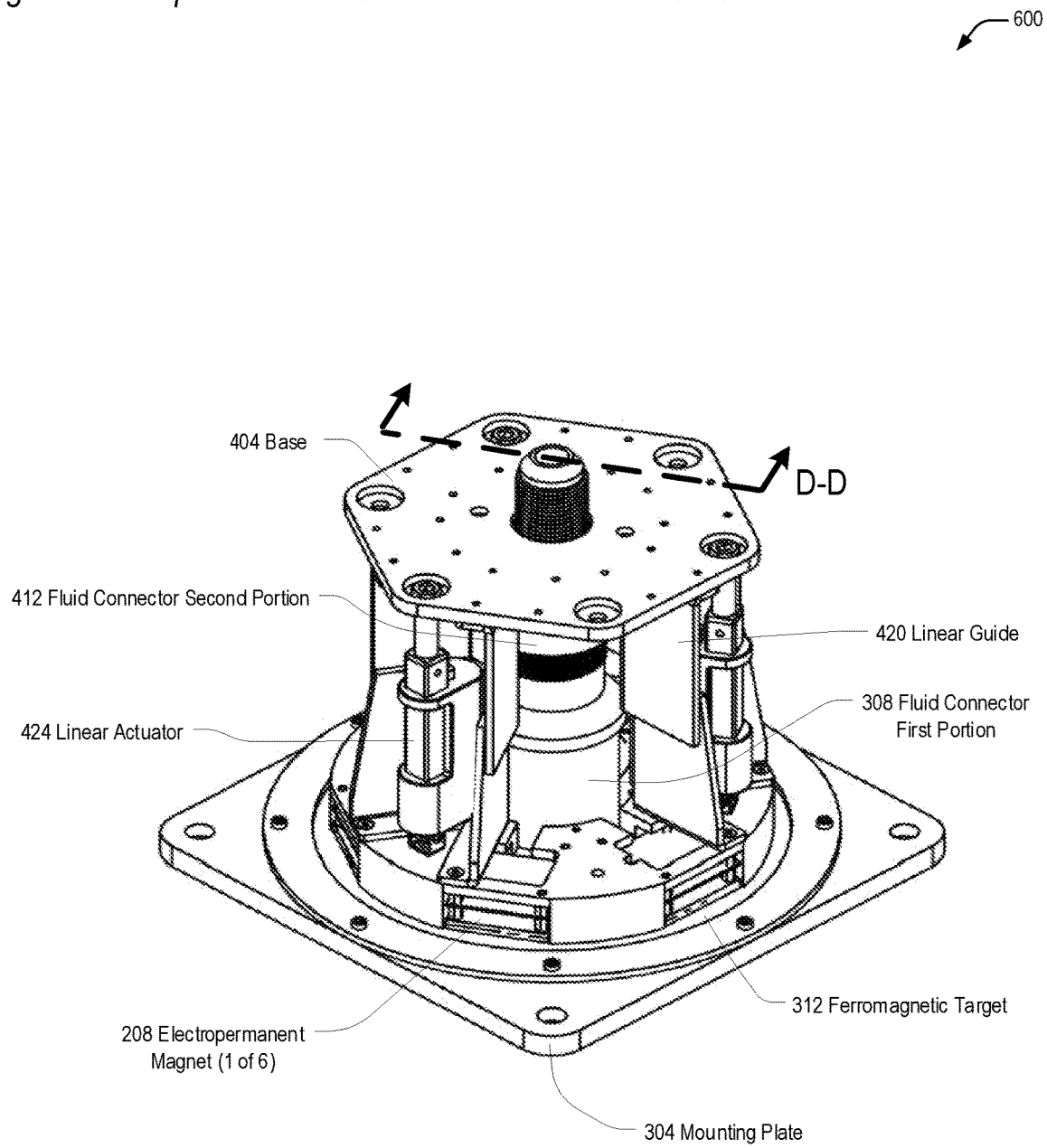

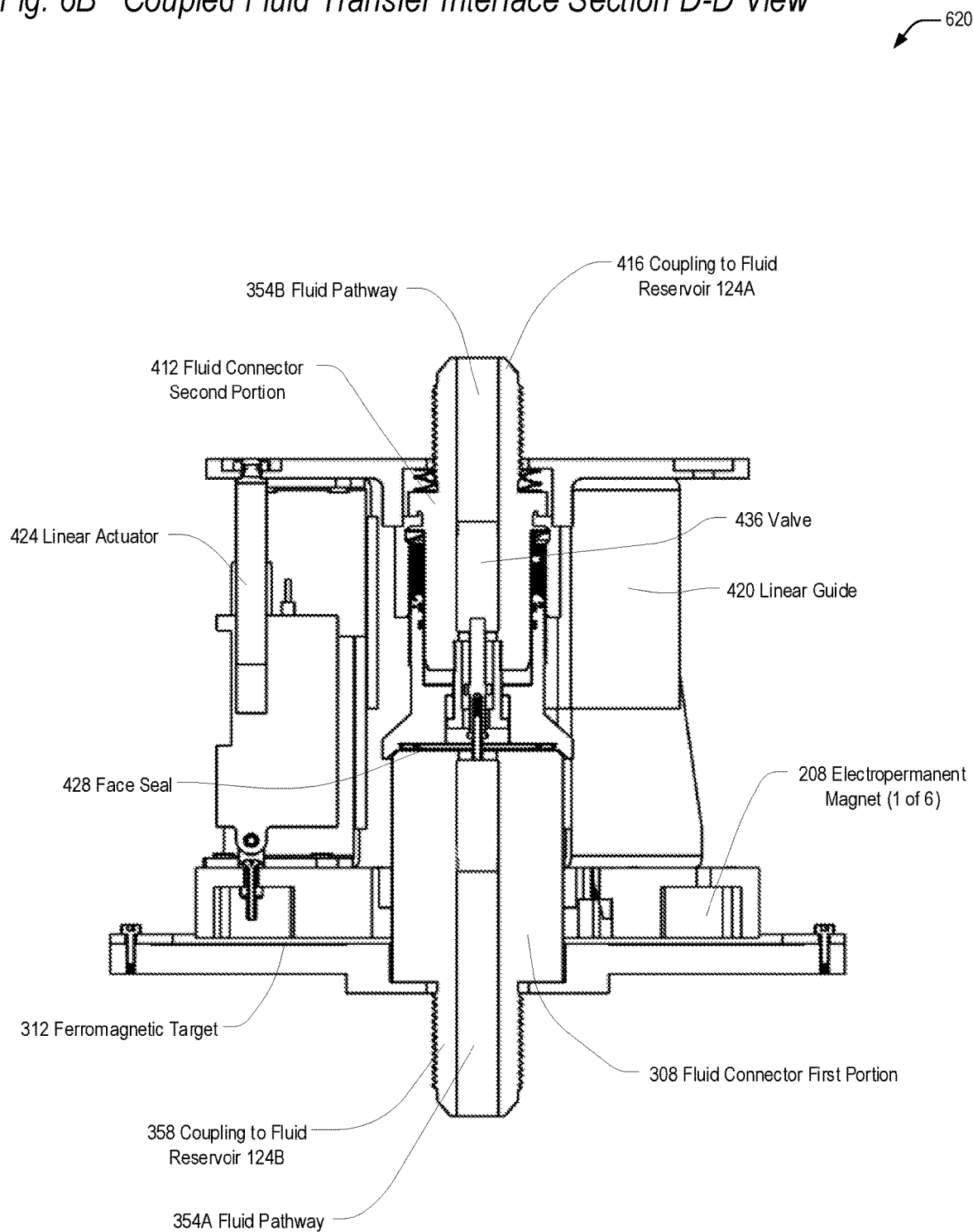
Fig. 6B Coupled Fluid Transfer Interface Section D-D View

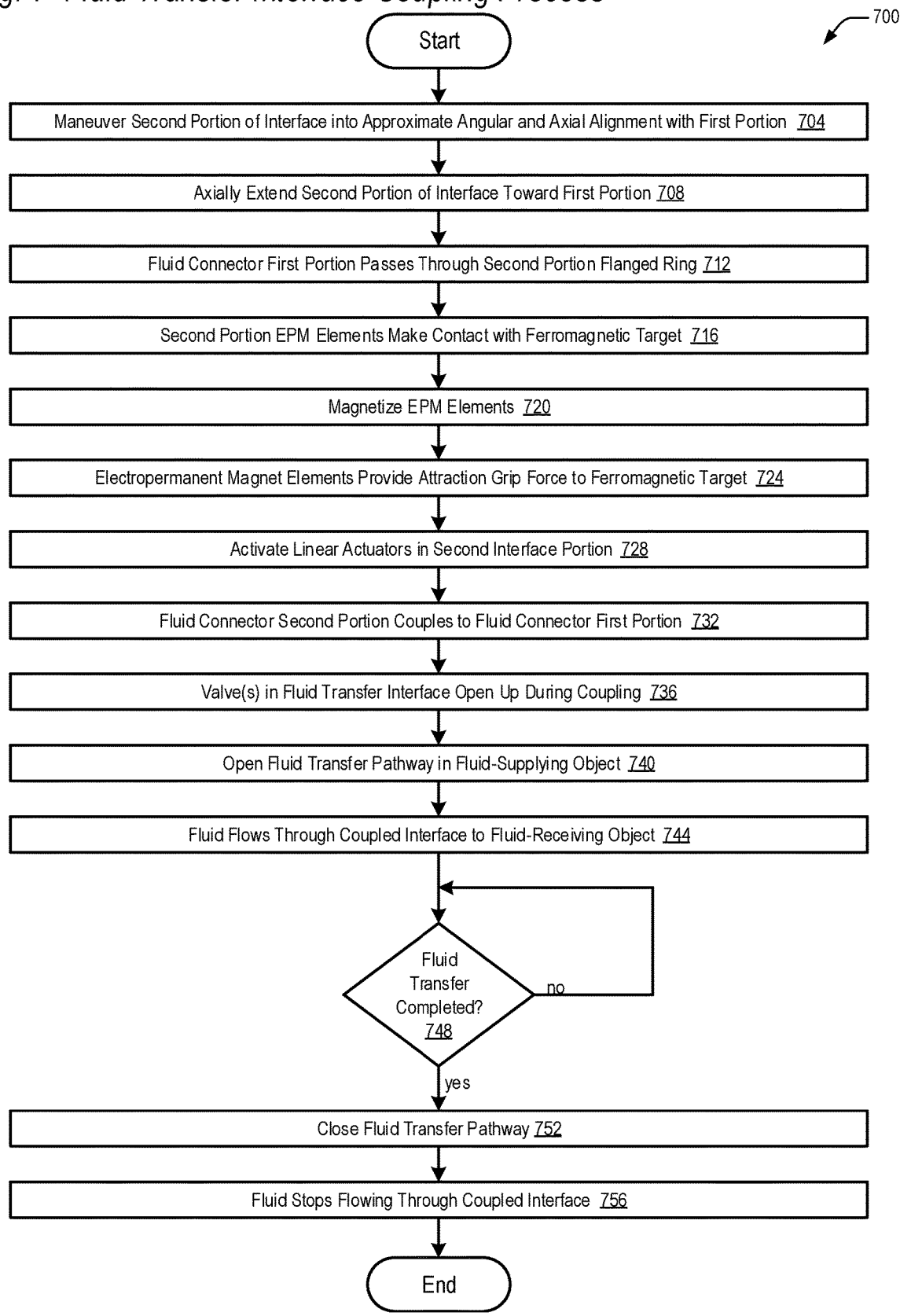
Fig. 7 Fluid Transfer Interface Coupling Process

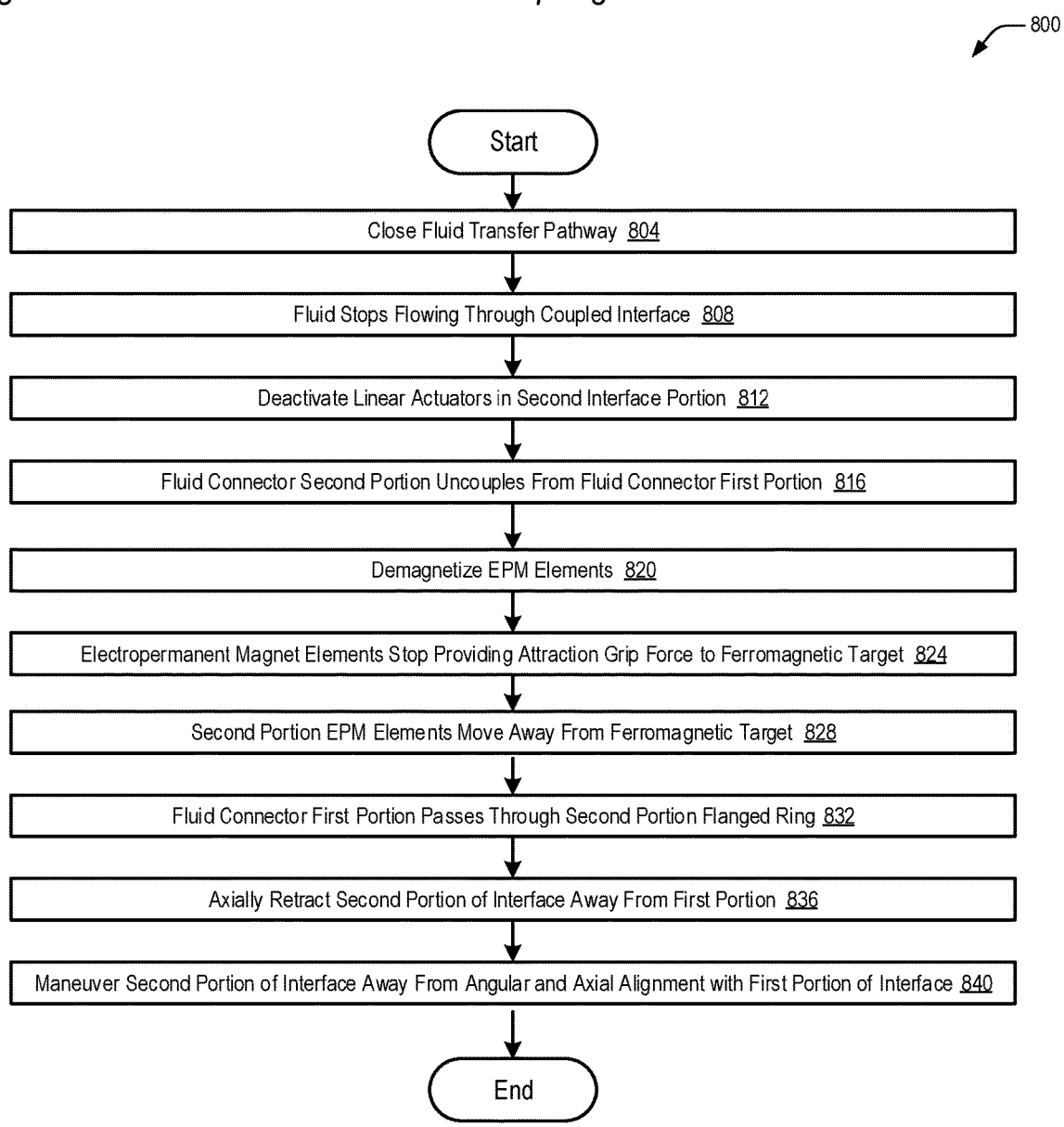
Fig. 8 Fluid Transfer Interface Decoupling Process

Fig. 9A  Posable Hose Side View
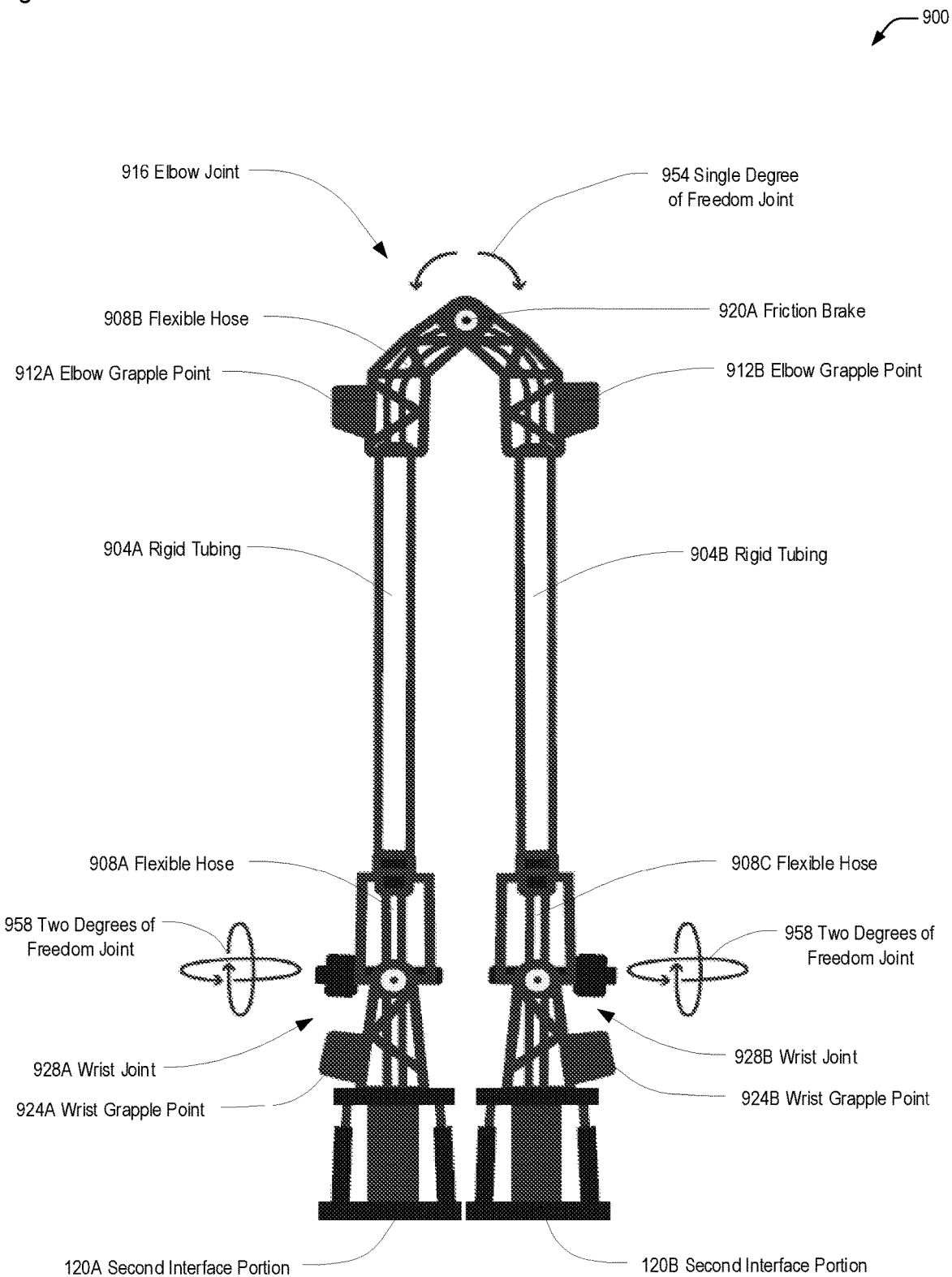

Fig. 9B  Posable Hose Isometric View
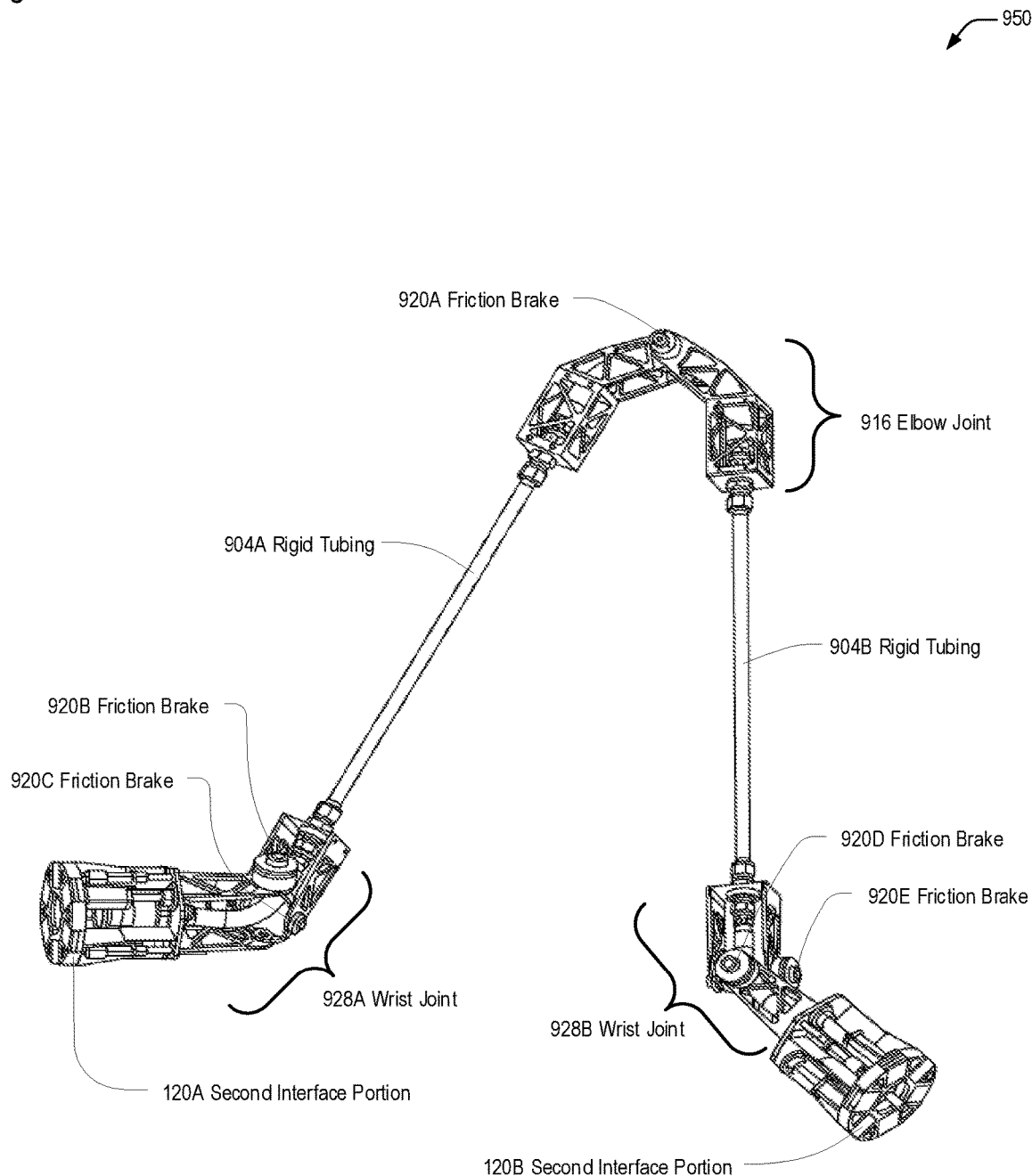

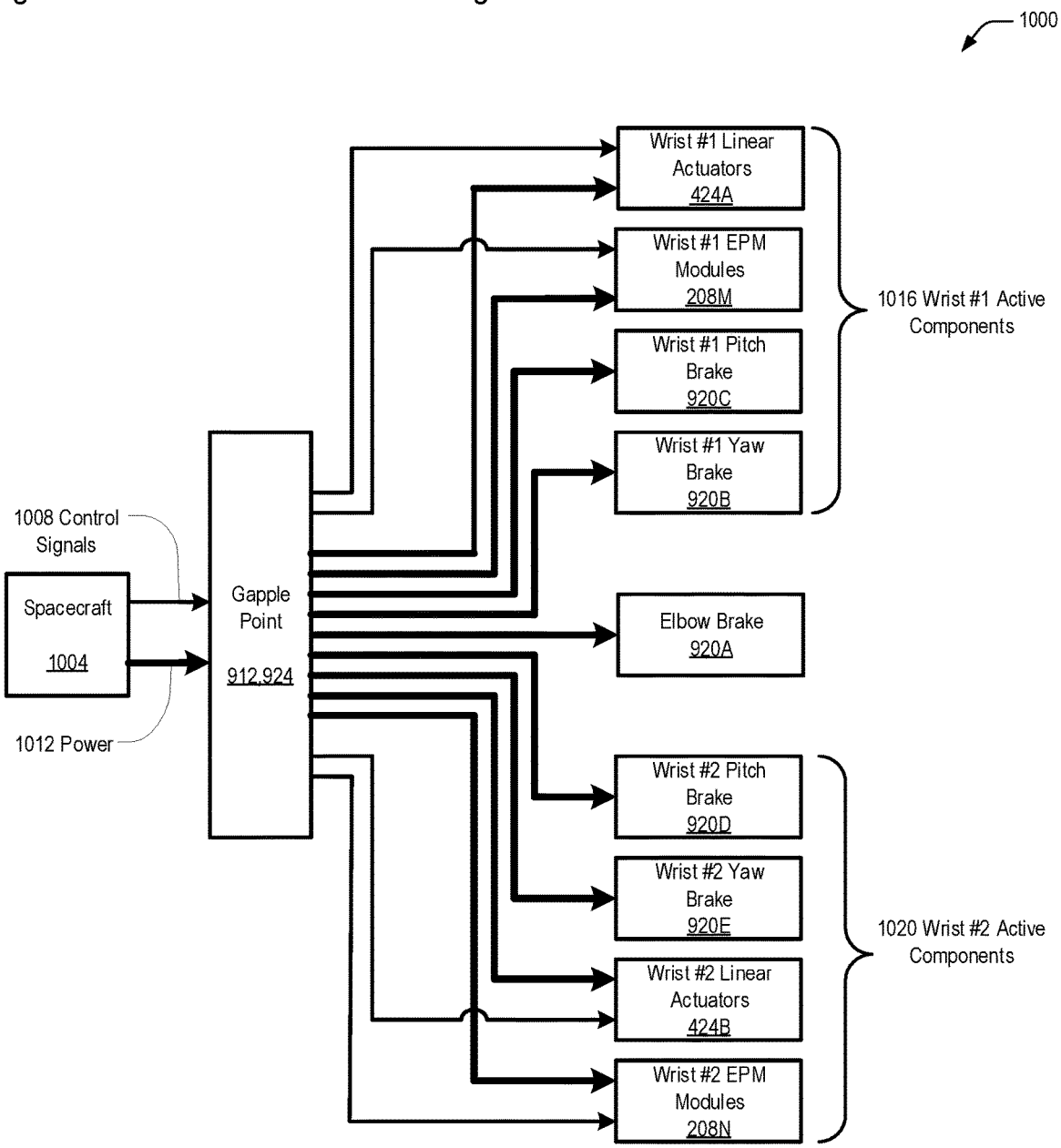
Fig. 10 Posable Hose Block Diagram

Fig. 11A  Object Capture
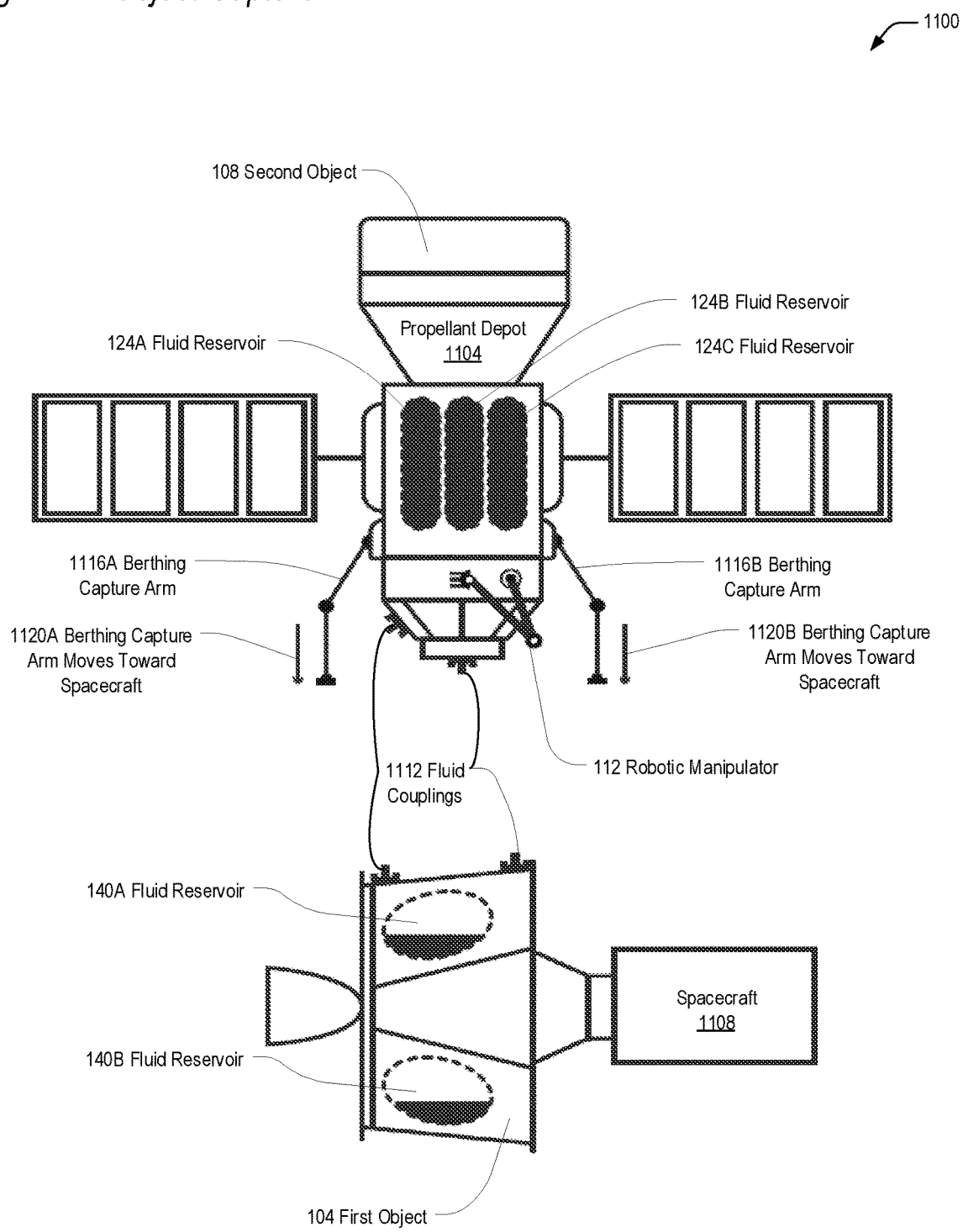

Fig. 11B  Posable Hose Preparation
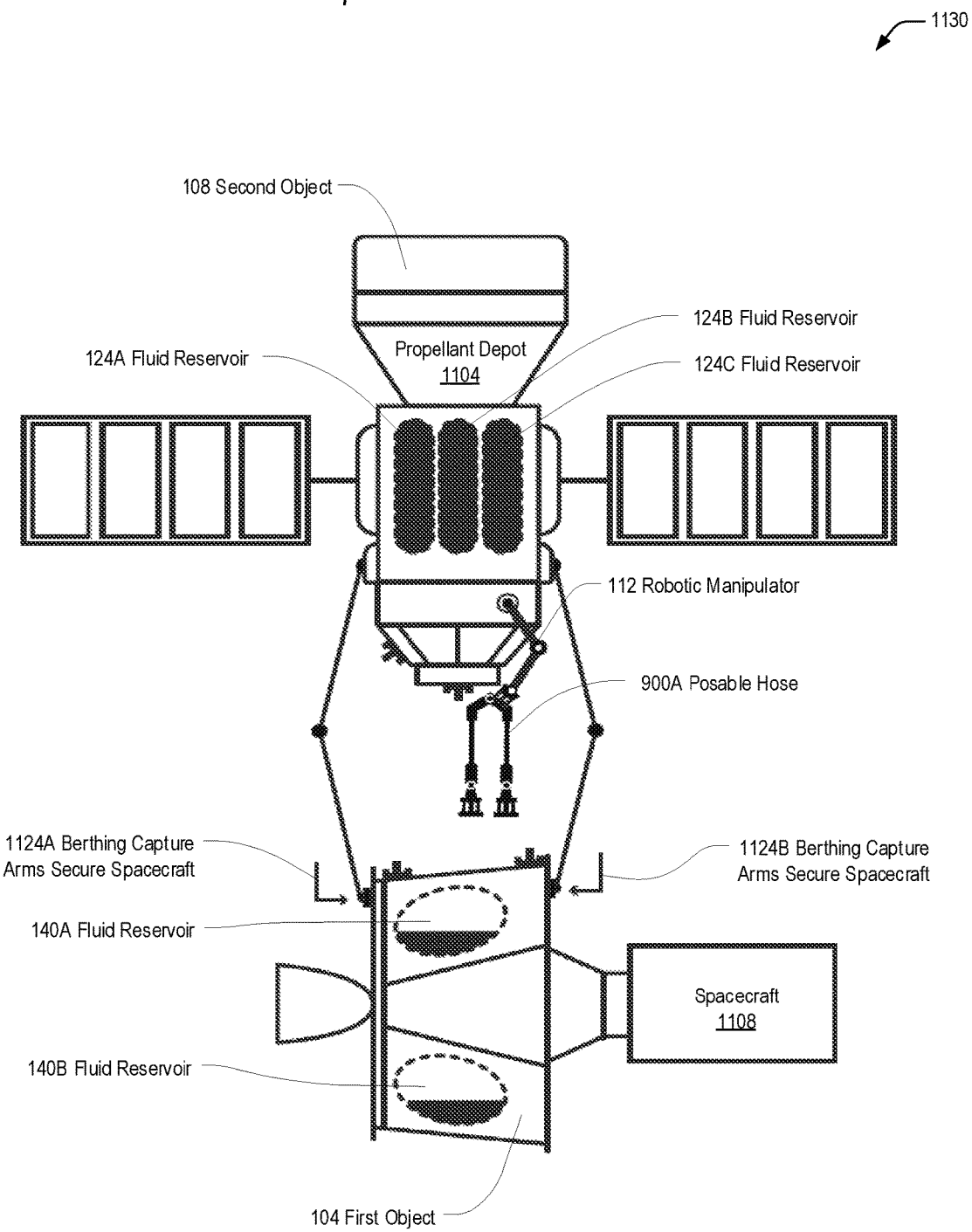

*Fig. 11C First Posable Hose Installation*
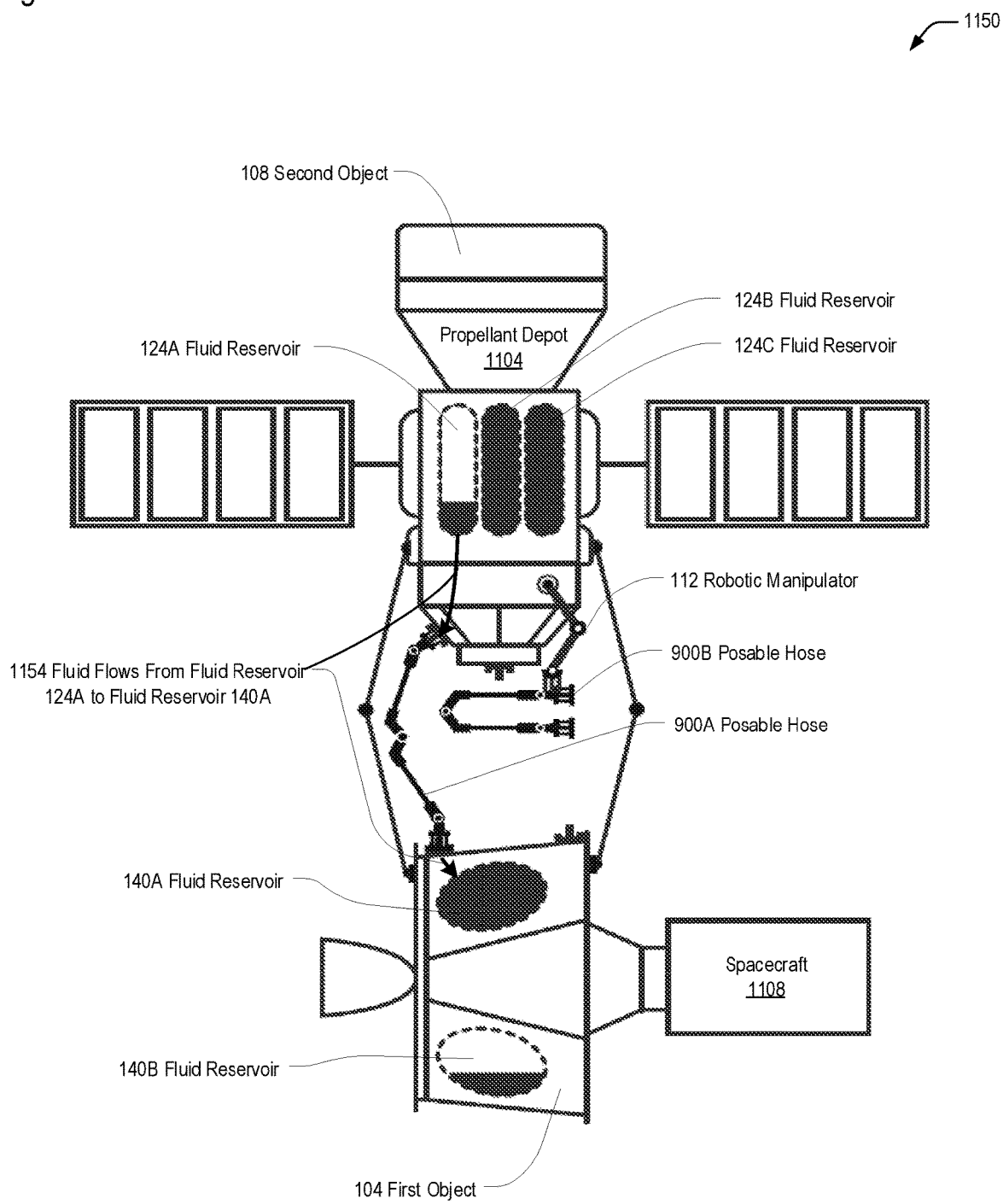

Fig. 11D  Second Posable Hose Installation
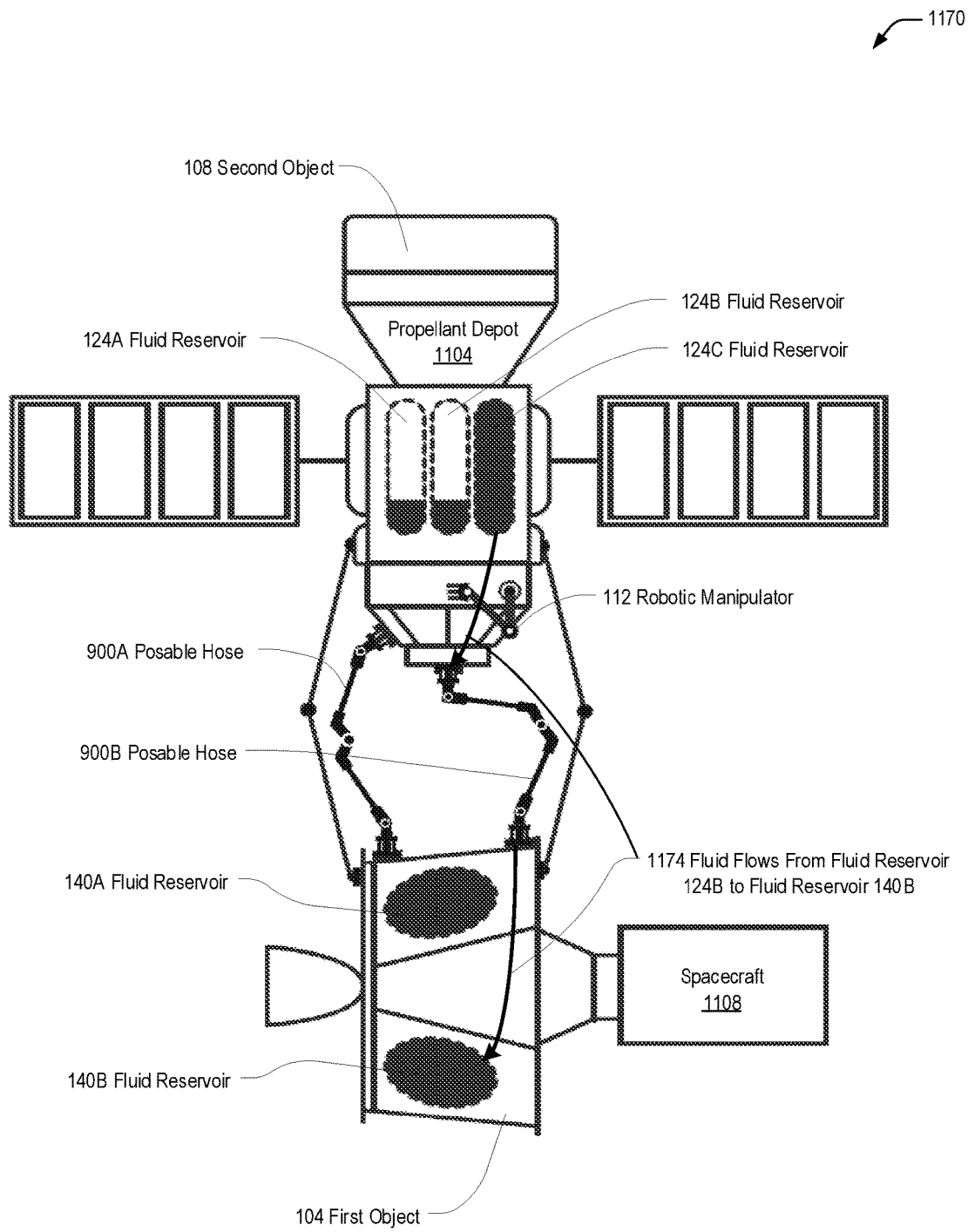

FLUID TRANSFER INTERFACE

CROSS REFERENCE TO RELATED APPLICATIONS

This application claims priority from Provisional U.S. application 62/986,244, filed Mar. 7, 2020, entitled REUSABLE FLUID TRANSFER DEVICE, which is hereby incorporated by reference for all purposes.

FIELD

The present application is directed to apparatuses and methods related to fluid transfers from a supply source to a demand destination. In particular, the present application is directed to apparatuses and methods for transferring cryogenic and/or non-cryogenic fluids between spacecraft.

BACKGROUND

There are a large variety of quick connect fittings, also called push fittings, on the market, employed in fluid transfer of all kinds. They may be used for all sorts of pneumatic power transfer, plumbing, heating, electrical, and fire suppression applications. Such fittings offer the benefits of significant time savings over older devices for connecting tubes and hoses, and of low skill requirements for their usage. In some cases, users may equip tubing with threadless push fittings specially made with teeth that are forced deeper into the tubing when opposing force is applied to them, preventing their separation from the tubing.

In North America, quick disconnect fittings are available in a variety of generic and proprietary types. For example, industrial-type interconnect and/or interchange fittings may be based on military specification MIL-C-4109F, ARO-type interconnect and/or interchange may be used for fluid applications, and automotive-type interconnect and/or interchange couplings based on a standard set forth for automotive shops, including inflation and pneumatic tools, may commonly be used.

SUMMARY

The present application is directed to solving disadvantages of the prior art. In accordance with embodiments of the present application, a fluid transfer interface may be provided. The fluid transfer interface may include one or more of a first interface portion and a second interface portion. The first interface portion includes a first portion of a fluid connector, centrally disposed within the first interface portion and configured to allow a fluid to pass therethrough and one or more ferromagnetic surfaces, laterally disposed around the first portion of the fluid connector. The second interface portion includes an extendable second portion of the fluid connector, centrally disposed within the second interface portion and configured to allow the fluid to pass therethrough to the first portion of the fluid connector in response to the first portion of the fluid connector is coupled to the second portion of the fluid connector and one or more electropermanent magnets, laterally disposed around the second portion of the fluid connector, configured to be magnetized or demagnetized in unison. The one or more electropermanent magnets are further configured to provide attraction force to the one or more ferromagnetic surfaces when magnetized and couple the first interface portion to the second interface portion and provide no attraction force to the one or more ferromagnetic surfaces when demagnetized and allow the first interface portion to be decoupled from the second interface portion.

In accordance with another embodiment of the present application, a method may be provided. The method includes one or more of maneuvering a second interface portion of a fluid transfer interface into approximate angular and axial alignment with a first interface portion of the fluid transfer interface, axially extending the second interface portion toward the first interface portion, and establishing contact between an electropermanent magnet ring of the second interface portion and a ferromagnetic target of the first interface portion. In response to establishing contact, the method includes one or more of changing the electropermanent magnet ring from a demagnetized state to a magnetized state, mating the second portion of the fluid connector to the first portion of the fluid connector, and enabling a fluid to pass between the second portion of the fluid connector and the first portion of the fluid connector. The first interface portion may include a first portion of a fluid connector and the second interface portion may include a second portion of the fluid connector. The fluid connector may be configured to allow a fluid to pass therethrough.

In accordance with yet another embodiment of the present application, a system may be provided. The system may include one or more of a first object, configured to receive a fluid, a second object, configured to provide the fluid, a second interface portion, and a flexible member including first and second ends. The first interface portion may include a first portion of a fluid connector, affixed to the first object and one or more ferromagnetic surfaces, orthogonally disposed around the first portion of the fluid connector and conformal with an exterior surface of the first object. The second interface portion may include a second portion of the fluid connector, configured to allow the fluid to pass therethrough and extend and retract with respect to the second interface portion and one or more electropermanent magnets, laterally disposed around the second portion of the fluid connector, configured to be magnetized or demagnetized in unison. The one or more electropermanent magnets may be further configured to provide attraction force to the one or more ferromagnetic surfaces when magnetized and couple the first interface portion to the second interface portion and provide no attraction force to the one or more ferromagnetic surfaces when demagnetized and allow the first interface portion to be decoupled from the second interface portion. The first end of the flexible member is coupled to the second object and the second end is coupled to the second interface portion and the second portion of the fluid connector. The flexible member is configured to maneuver the second interface portion relative to the first interface portion and pass the fluid therethrough.

BRIEF DESCRIPTION OF THE DRAWINGS

FIG. 1A is a diagram illustrating a spacecraft fluid transfer system, in accordance with a first embodiment of the present invention.

FIG. 1B is a diagram illustrating a spacecraft fluid transfer system, in accordance with a second embodiment of the present invention.

FIG. 1C is a diagram illustrating a spacecraft fluid transfer system, in accordance with embodiments of the present invention.

FIG. 1D is a diagram illustrating a spacecraft fluid transfer system, in accordance with embodiments of the present invention.

FIG. 1E is a diagram illustrating a spacecraft fluid transfer system, in accordance with embodiments of the present invention.

FIG. 2A is a diagram illustrating electropermanent magnetization, in accordance with embodiments of the present invention.

FIG. 2B is a diagram illustrating electropermanent demagnetization, in accordance with embodiments of the present invention.

FIG. 3A is a diagram illustrating an isometric view of a first interface portion, in accordance with embodiments of the present invention.

FIG. 3B is a diagram illustrating an exploded view of the first interface portion, in accordance with embodiments of the present invention.

FIG. 3C is a diagram illustrating a sectional view A-A of the first interface portion, in accordance with embodiments of the present invention.

FIG. 4A is a diagram illustrating an isometric view of a second interface portion, in accordance with embodiments of the present invention.

FIG. 4B is a diagram illustrating an exploded view of the second interface portion, in accordance with embodiments of the present invention.

FIG. 4C is a diagram illustrating a side view of the second interface portion, in accordance with embodiments of the present invention.

FIG. 4D is a diagram illustrating a sectional view B-B of the second interface portion, in accordance with embodiments of the present invention.

FIG. 5A is a diagram illustrating an isometric view of an uncoupled fluid transfer interface, in accordance with embodiments of the present invention.

FIG. 5B is a diagram illustrating a sectional view C-C of the uncoupled fluid transfer interface, in accordance with embodiments of the present invention FIG. 6A is a diagram illustrating an isometric view of a coupled fluid transfer interface, in accordance with embodiments of the present invention FIG. 6B is a diagram illustrating a sectional view D-D of the coupled fluid transfer interface, in accordance with embodiments of the present invention.

FIG. 7 is a flowchart illustrating a fluid transfer interface coupling process, in accordance with embodiments of the present invention.

FIG. 8 is a flowchart illustrating a fluid transfer interface decoupling process, in accordance with embodiments of the present invention.

FIG. 9A is a diagram illustrating a side view of a posable hose, in accordance with embodiments of the present invention.

FIG. 9B is a diagram illustrating an isometric view of a posable hose, in accordance with embodiments of the present invention.

FIG. 10 is a block diagram illustrating a posable hose, in accordance with embodiments of the present invention.

FIG. 11A is a diagram illustrating object capture, in accordance with embodiments of the present invention.

FIG. 11B is a diagram illustrating posable hose preparation, in accordance with embodiments of the present invention.

FIG. 11C is a diagram illustrating a first posable hose installation, in accordance with embodiments of the present invention.

FIG. 11D is a diagram illustrating a second posable hose installation, in accordance with embodiments of the present invention.

DETAILED DESCRIPTION

The technology described in the present application was developed under NASA SBIR Phase II Contract #NNX17CJ07C "Lightweight, High-Flow, Low Connection-Force, In-Space Cryogenic Propellant Coupling". The technology described in the present application was refined under NASA Contract #80MSFC19C0032 "NextSTEP-2 Appendix E: Human Landing System Studies, Risk Reduction, Development, and Demonstration—Refueling Prototypes".

Referring now to FIG. 1A, a diagram illustrating a spacecraft fluid transfer system 100, in accordance with the present invention is shown. FIG. 1A illustrates a fluid transfer operation from a fluid reservoir 124 of a second object 108 to a fluid reservoir 140 of a first object 104. The direction of fluid transfer 136A is as indicated in FIG. 1A. In one embodiment, one or both of the first object 104 and the second object 108 may be spacecraft. In one embodiment, one or both of the first object 104 and the second object 108 may be objects different than a spacecraft, including terrestrial fluid storage devices. In one embodiment, the fluid being transferred may be a cryogenic fluid including a cryogenic fuel. In the illustrated embodiment, the first object 104 may include a fluid reservoir 140 to store the received fluid, and the second object 108 may include fluid reservoir 124 to supply the sourced fluid. The fluid reservoir 124 in this embodiment has a more than empty fluid level 132 and is able to provide some fluid to the first object 104. Additionally, the fluid reservoir 140 in the first object 104 has a less than full fluid level 128 and is therefore able to receive some fluid from the second object 108. In this way, it is not necessary that fluid reservoir 124 contain more fluid than fluid reservoir 140, although that is likely the most common situation.

In one embodiment, the second object 108 may be coupled to a robotic manipulator 112. One end of the robotic manipulator 112 may be coupled to the second object 108 while the opposite end may be coupled to a second interface portion 120 of a fluid transfer interface. In one embodiment, the fluid may pass through a fluid pathway of the robotic manipulator 112 to the second interface portion 120. One or more controlled valves associated with the fluid reservoir 124, the second object 108, and/or the robotic manipulator 112 may allow or prevent fluid flow to the second interface portion 120. These valves may be in addition to check valves or poppet valves associated with either the first and/or second interface portions 116, 120. In another embodiment, the fluid reservoir 140 may be less than full after the fluid transfer is completed and/or it may require multiple fluid transfers from different second objects 108 to fill the fluid reservoir 140. In one embodiment, the second interface portion 120 may transfer fluid to the first interface portion 116 after the second interface portion 120 is coupled to the first interface portion 116, as described herein.

Either or both of the first object 104 and/or the second object 108 may have more than one fluid reservoir 124/140 and interfaces 116/120 in order to store and transfer different fluids. For example, different accommodation may be necessary to transfer and store cryogenic fluid(s), room temperature storable fluids (e.g., water and/or pressurized gases such as helium)r, lubricant(s), or any other types of fluids. In one embodiment, cryogenic fluids may include liquid oxygen, liquid hydrogen, and/or liquid methane. In addition, there may be multiple and different second objects 108 to provide different fluids to the first object 104 and fluid reservoir(s) 140.

The robotic manipulator 112 may be controlled in order to position the second interface portion 120 in proximity to the first interface portion 116. For example, a person or computer associated with the second object 108 may provide controls or instructions to the robotic manipulator 112 in order to maneuver the second interface portion 120 in order to dock or couple it with the first interface portion 116. The person or computer may additionally have the capability of maneuvering the second object 108 in order to be within a successful capture or docking range of the robotic manipulator 112.

In one embodiment, there may be various components to provide a negative or positive pressurization to a fluid being transferred between the first 104 and second 108 objects. However, any required pressurization is outside the scope of the present application.

In one embodiment, the first interface portion 116 is affixed to a first object 104, where the second interface portion 120 is configured to be movable relative to the first interface portion 116 and transfer the fluid between a second object 108 coupled to the second interface portion 120 and the first object 104 after the first interface portion 116 is coupled to the second interface portion 120.

In one embodiment, a system includes a first object 104, configured to receive a fluid, which includes a first interface portion 116. The first interface portion includes a first portion 308 of a fluid connector, affixed to the first object 104, and one or more ferromagnetic surfaces 312, orthogonally disposed around the first portion of the fluid connector 308 and conformal with an exterior surface of the first object 104. The system also includes a second object 108, configured to provide the fluid. The second object 108 includes a second interface portion 120, which includes a second portion of the fluid connector 412 and one or more electropermanent magnets 208, laterally disposed around the second portion of the fluid connector 412, configured to be magnetized or demagnetized in unison. The one or more electropermanent magnets 208 are further configured to provide attraction force to the one or more ferromagnetic surfaces 312 when magnetized and couple the first interface portion 116 to the second interface portion 120, and provide no attraction force to the one or more ferromagnetic surfaces 312 when demagnetized and allow the first interface portion 116 to be decoupled from the second interface portion 120. The system also includes a flexible member or robotic manipulator 112 including first and second ends, the first end coupled to the second object 108 and the second end coupled to the second interface portion 120 and the second portion of the fluid connector 412, configured to maneuver the second interface portion 120 relative to the first interface portion 116 and pass the fluid therethrough. The first 308 and second 412 portions of the fluid connector are configured to allow the fluid to pass therethrough and extend and retract with respect to the second interface portion 120.

Referring now to FIG. 1B, a diagram illustrating a spacecraft fluid transfer system 150 in accordance with a second embodiment of the present invention is shown. FIG. 1B illustrates an embodiment where the first object 104 may also have a capability to provide one or more stored fluids externally, such as back to the second object 108 or another spacecraft or vehicle. The direction of fluid transfer 136B is as indicated in FIG. 1B. In one embodiment, an exterior surface of the first object 104 may have a combination of first 116 and second 120 interface portions. In another embodiment, described below, the first object 104 may have a first interface portion 116 that provides a fluid to a coupled second interface portion 120.

The fluid reservoir 124 in this embodiment has a less than full fluid level 128 and is able to receive some fluid from the first object 104. Additionally, the fluid reservoir 140 in the first object 104 has a more than empty fluid level 132 and is therefore able to provide some fluid to the second object 108. In this way, it is not necessary that fluid reservoir 140 contain more fluid than fluid reservoir 124, although that is likely the most common situation.

Either or both of the first object 104 and/or the second object 108 may have more than one fluid reservoir 124/140 and interfaces 116/120 in order to store and transfer different fluids. For example, different accommodation may be necessary to transfer and store cryogenic fluid(s), water, lubricant(s), or any other types of fluids. In addition, there may be multiple and different first objects 104 to provide different fluids to the second object 108 and fluid reservoir(s) 124.

In one embodiment, the second object 108 may be coupled to a robotic manipulator 112. One end of the robotic manipulator 112 may be coupled to the second object 108 while the opposite end may be coupled to a second interface portion 120 of a fluid transfer interface. In one embodiment, the fluid may pass through a fluid pathway of the first object 104, through the coupled second interface portion 120, through the robotic manipulator 112, and to the second object 108. One or more controlled valves associated with the fluid reservoir 140 or the first object 104 may allow or prevent fluid flow to the first interface portion 116. These valves may be in addition to check valves or poppet valves associated with either the first and/or second interface portions 116, 120. In another embodiment, the fluid reservoir 124 may still be less than full after the fluid transfer is completed and/or it may require multiple fluid transfers from different first objects 104 to fill the fluid reservoir 124. In one embodiment, the first interface portion 116 may transfer fluid to the second interface portion 120 after the first interface portion 116 is coupled to the second interface portion 120, as described herein.

The robotic manipulator 112 may be controlled in order to position the second interface portion 120 in proximity to the first interface portion 116. For example, a person or computer associated with the second object 108 may provide controls or instructions to the robotic manipulator 112 in order to maneuver the second interface portion 120 in order to dock it with the first interface portion 116. The person or computer may additionally have the capability of maneuvering the second object 108 in order to be within a successful capture or docking range of the robotic manipulator 112.

In one embodiment, there may be various components to provide a negative or positive pressurization to a fluid being transferred between the first 104 and second 108 objects. However, any required pressurization is outside the scope of the present application.

Referring now to FIG. 1C, a diagram illustrating a spacecraft fluid transfer system 160 in accordance with embodiments of the present invention is shown. FIG. 1C illustrates an embodiment where the second object 108 may provide one or more fluids to the first object 104 through umbilical active halves 162. Two umbilical active halves 162 are shown in FIG. 1C, identified as umbilical active half 162A and umbilical active half 162B. A fluid reservoir 124 of the second object 108 is mostly full, and transfers a fluid to two fluid reservoirs 140A/140B in the first object 104, which are shown as mostly empty. In other embodiments (see FIGS. 11A-11D), different types of fluids may be stored in the second object 108. Each type of fluid may be stored in a different fluid reservoir 124 and have separate and different fluid couplings 1112 from those used for other types of fluids, where each fluid coupling 1112 may be either a first portion interface 116 or a second portion interface 120.

In the illustrated embodiment, the second object 108 captures the first object 104 prior to transferring fluids. A docking probe 144 is coupled to, and controlled by, the second object 108. In this embodiment, no fluids pass through the docking probe 144. The free end of the docking probe 144 in this embodiment includes a capture plug 164. The capture plug 164 is configured to engage a capture socket 166 affixed to an exterior surface of the first object 104. The robotic manipulator 112 extends the plug toward the socket 168. This is performed after the second object 108 maneuvers to a position relative to the first object 104 where the distance between the first 104 and second 108 objects is within a capture range of the docking probe 144 and the second object 108 has an attitude relative to the capture socket 166 where a reliable connection may be secured.

Referring now to FIG. 1D, a diagram illustrating a spacecraft fluid transfer system 170 in accordance with embodiments of the present invention is shown. FIG. 1D illustrates the capture plug 164 engaged with and secured to the capture socket 166. The second object has been rigidly secured to the first object 172. At this point, the second object 108 extends 174A/174B umbilical active halves 162A/162B toward the first interface portions 116A/116B.

Referring now to FIG. 1E, a diagram illustrating a spacecraft fluid transfer system 180 in accordance with embodiments of the present invention is shown. FIG. 1E illustrates the second object 108 fully secured to the first object 104. Fully secured includes the capture plug 164 previously mated to the capture socket 166 (FIG. 1C) and the second interface portions 120A/120B previously mated to the first interface portions 116A/116B (FIG. 1D), respectively. The fluid is transferred 182A/182B from the fluid reservoir 124 of the second object 108 to each of the fluid reservoirs 140A/140B of the first object 104. FIG. 1E illustrates the conclusion of the fluid transfer 182 operation, where the fluid reservoir 124 of the second object 108 has a lower fluid level compared with the mostly full fluid level shown in FIGS. 1C and 1D, and the fluid reservoirs 140A/140B of the first object 104 are full. After this point, the second interface portions 120A/120B may be decoupled from the first interface portions 116A/116B, respectively, the umbilical active halves 162A/162B may be retracted, the capture plug 164 may be released from the capture socket 166, and the docking probe 144 may be withdrawn toward the second object 108. At this point, the second object 108 is free to be maneuvered away from the first object 104.

Referring now to FIG. 2A, a diagram illustrating electropermanent magnetization 200 in accordance with embodiments of the present invention is shown. The fluid transfer interface may include one or more electropermanent magnets 208. Electropermanent magnets 208 may be selectively magnetized and/or demagnetized under computer control. In the illustrated embodiment, there are six EPM elements 208, identified as EPM 208A, EPM 208B, EPM 208C, EPM 208D, EPM 208E, and EPM 208F. In other embodiments there may be one or more EPM elements 208, including fewer than six or more than six EPM elements 208. EPMs 208 may be configured as an electropermanent magnet ring, where the EPMs 208 are organized in a substantially circular arrangement. Details of electropermanent magnet 208 magnetization operation and components are fully described in related U.S. patent application Ser. No. 16/876,096, titled "Electropermanent Magnet Array".

FIG. 2A describes high level functionality to magnetize 200 the electropermanent magnets (EPM) 208 or electropermanent magnet elements 208. Once magnetized to a desired level, the EPMs 208 provide an attraction force to a ferromagnetic target 220. EPMs 208 are controlled by a control circuit 204, which may be present within the second interface portion 120, the robotic manipulator 112, or the second object 108. The control circuit 204 may include one or more processors, memories, chargers, energy storage devices, and switches that convert received commands into current pulses to each of the EPMs 208. In the case of magnetization (i.e. causing the EPMs 208 to have a defined magnetic field), the control circuit 204 may receive a number of first commands 212 from the second object 108. The first command(s) may be received over a wired or wireless interface, and in one embodiment the first command(s) may pass through the robotic manipulator 112. In response to receiving the first command(s) 212, the control circuit 204 may generate unipolar current pulses 216 to each of the EPMs 208. The unipolar current pulses 216 have a defined amplitude and pulsewidth that builds up the magnetic fields in the EPMs 208.

Ferromagnetic materials may be divided into magnetically "soft" materials like annealed iron, which can be magnetized but do not tend to stay magnetized, and magnetically "hard" materials, which do. Permanent magnets are made from "hard" ferromagnetic materials such as alnico, an aluminum, nickel, and cobalt alloy, alloys of neodymium and other rare earth materials, and ferrite that are subjected to special processing in a strong magnetic field during manufacture to align their internal microcrystalline structure, making them very hard to demagnetize. To demagnetize a saturated magnet, a certain magnetic field must be applied, and this threshold depends on coercivity of the respective material. "Hard" materials have high coercivity, whereas "soft" materials have low coercivity. The overall strength of a magnet is measured by its BH product. The local strength of magnetism in a material is measured by its magnetization.

An electromagnet may be made from a coil of wire that acts as a magnet when an electric current passes through it but stops being a magnet when the current stops. Often, the coil is wrapped around a core of "soft" ferromagnetic material such as mild steel, which greatly enhances the magnetic field produced by the coil. The electropermanent magnet elements 208 of the present application is described below, and may be used in two discrete states:

Demagnetized—electropermanent magnet elements 208 may be turned off by demagnetizing the electropermanent magnet elements 208, which results in there being no magnetic poles at all. That is, there is no north pole, no south pole, and there is no attraction or repulsion force at all.

Magnetized—this configuration causes all magnetic flux field lines to take a short and concentrated path through the target ferromagnetic material to a neighboring pole of opposite polarity. Because almost all of the magnetic flux is forced through the target material, grip force may be maximized. Electropermanent magnet elements 208 have many advantages over conventional permanent magnets. For example, electropermanent magnets 208 have no moving parts and may be demagnetized in order to minimize decoupling force between the first 116 and second 120 interface portions.

In one embodiment, the first command 212 may designate the EPMs 208 magnetized to a desired level. For example, in response to receiving the first command 212, the control circuit 204 may generate one or more unipolar current pulses 216 with a defined amplitude and pulsewidth to the EPMs 208. If multiple unipolar current pulses 216 are required, the control circuit 204 may provide a desired delay between pulses 216.

In another embodiment, multiple first commands 212 may designate the EPMs 208 magnetized to a desired level. For example, in response to receiving each first command 212, the control circuit 204 may generate only one unipolar current pulse 216 with a defined amplitude and pulsewidth to the EPMs 208. In one embodiment, the timing between received first commands 212 may correspond to timing between unipolar current pulses 216. In one embodiment, the amplitude and pulsewidth of the unipolar current pulses 216 may be controlled by the control circuit 204. In another embodiment, the amplitude and pulsewidth of the unipolar current pulses 216 may be specified within each first command 212. In one embodiment (not shown), the control circuit 204 may provide an indication to the second object 108 that the EPMs 208 are charged to a desired level of magnetization.

Referring now to FIG. 2B, a diagram illustrating electropermanent demagnetization 230 in accordance with embodiments of the present invention is shown. Details of electropermanent magnet demagnetization operation and components are also fully described in related U.S. patent application Ser. No. 16/876,096, titled "Electropermanent Magnet Array".

FIG. 2B describes high level functionality to demagnetize 230 the electropermanent magnets (EPM) 208 or electropermanent magnet elements 208. Once demagnetized, the EPMs 208 provide no attraction force to a ferromagnetic target 242. EPMs 208 are controlled by the control circuit 204, which may be present within the second interface portion 120, the robotic manipulator 112, or the second object 108. The control circuit 204 may include one or more processors, memories, chargers, energy storage devices, and switches that convert received commands into current pulses to each of the EPMs 208. In the case of demagnetization 230 (i.e. causing the EPMs 208 to have no magnetic field), the control circuit 204 may receive a number of second commands 234 from the second object 108. The second command(s) 234 may be received over a wired or wireless interface, and in one embodiment the second command(s) 234 may pass through the robotic manipulator 112. In response to receiving the second command(s) 234, the control circuit 204 may generate alternating polarity current pulses 238 to each of the EPMs 208. The alternating polarity current pulses 238 may have a defined amplitude and pulsewidth that reduces the magnetic fields in the EPMs 208 from a previously magnetized state. In one embodiment, the alternating polarity current pulses 238 alternate between a positive polarity pulse (positive current), and a negative polarity pulse (negative current). In another embodiment, the alternating polarity current pulses 238 successively reduce in amplitude until the EPMs 208 are demagnetized.

In one embodiment, a second command 234 may correspond to a pair of alternating polarity current pulses 238. For example, in response to receiving the second command 234, the control circuit 204 may generate a pair of alternating polarity current pulses 238 with a defined amplitude and pulsewidth to the EPMs 208. In one embodiment, the second command 234 may specify one or more of the amplitude or pulsewidth of the alternating polarity current pulses 238. In one embodiment, the timing between second commands 234 may correspond to the timing between alternating polarity current pulses 238.

In one embodiment, the amplitude and pulsewidth of the alternating polarity current pulses 238 may be controlled by the control circuit 204. In another embodiment, the amplitude and pulsewidth of the alternating polarity current pulses 238 may be specified within each second command 234. In one embodiment (not shown), the control circuit 204 may provide an indication to the second object 108 that the EPMs 208 are fully demagnetized.

In one embodiment, the control circuit 204 is elegy electrically coupled to the one or more electropermanent magnets 208, and is configured to magnetize the one or more electropermanent magnets 208 in response to one or more first commands 212 and demagnetize the one or more electropermanent magnets 208 in response to one or more second commands 234.

Referring now to FIG. 3A, a diagram illustrating an isometric view of a first interface portion 116 in accordance with embodiments of the present invention is shown. The first interface portion 116 is intended to be statically mounted to the first object 104, and couple to the second interface portion 120. FIG. 3A also indicates a section A-A, which applies to the first interface portion section view, shown in FIG. 3C.

The first interface portion 116 may include a mounting plate 304. The mounting plate 304 may be secured or affixed to the first object 104 by one or more fasteners, brazing, soldering, gluing, or any other permanent attachment method known in the art. The mounting plate 304 may be made from a preferably rigid material including but not limited to stainless steel or aluminum.

The first interface portion 116 may also include one or more fluid connector first portions 308. That is, multiple fluid connector first portions 308 may utilize a same ferromagnetic target 312. This may allow different fluids to be simultaneously transferred through multiple fluid transfer interfaces. The fluid connector first portion 308 projects outward from the mounting plate 304, and includes a central channel through which fluid may pass to and from a fluid reservoir 140 associated with the first object 104. The fluid connector first portion 308 mates with and couples to a fluid connector second portion 412 as shown and described herein. In one embodiment, the fluid connector first portion 308 may include a first portion sealing surface 316. The first portion sealing surface 316 may bear against one or more seals associated with the fluid connector second portion 412 in order to provide a leak proof fluid transfer interface. In other embodiments, the sealing surface 316 may also include a face seal to bear against a sealing surface of the fluid connector second portion 412. In one embodiment, the fluid connector first portion 308 may also include one or more valves to control fluid flow and/or one or more radial seals.

The first interface portion 116 may also include one or more ferromagnetic targets 312. Ferromagnetic targets 312 provide a magnetic attraction surface for the electropermanent magnets 208 described herein. The ferromagnetic target(s) 312 may be a single continuous surface as shown, or a series of flat ferromagnetic surfaces distributed around the fluid connector first portion 308. Each of the ferromagnetic target(s) 312 may include a thin (potentially <1 mm) ferromagnetic material layer (e.g., Hiperco-50) that allows the electropermanent magnets 208 to magnetically grip the ferromagnetic target 312. In the preferred embodiment, the ferromagnetic target 312 is made from a Hyperco-50 alloy (an approximately 50/50 Iron/Cobalt alloy). Carpenter 49 (an approximately 49% Iron/Nickel alloy having lower saturation flux and lower coercivity) or other alloys including silicon electric steel or soft magnetic composites such as Somaloy may be used. The ferromagnetic target 312 retains very little residual magnetization when not subjected to an external magnetic field, which minimizes magnetic interference with the first object 104. The ferromagnetic target 312 may include aluminum cladding that enables easier bonding and may protect the ferromagnetic target 312 from corrosion. Aluminum cladding may provide a way to anodize-in, or adhesively bond on durable optical fiducial markings that may aid in machine vision used for aligning and connecting the first 308 and second 412 portions of the fluid transfer interface. In one embodiment, the flatness of the ferromagnetic target 312 may be approximately +/−0.001" per linear foot.

The ferromagnetic target 312 may be manufactured by laser or water jet cutting or machining the material to the correct shape, annealing it to achieve optimal magnetic properties, cold-spraying a 75 µm 1100 aluminum coating (i.e. cladding) onto both sides, and phosphoric acid anodizing both sides of the ferromagnetic target 312. In another embodiment, the aluminum coating may be applied via electroplating. In another embodiment, the aluminized Hiperco-50 may be replaced by a more corrosion-resistant soft magnetic alloy such as Carpenter High Permeability 49 alloy, which would not require aluminum plating. Carpenter High Permeability 49 alloy may be aluminum plated and anodized/pixodized. In another embodiment, the ferromagnetic target 312, after annealing to achieve optimal magnetic properties, may be clad onto the underlying mounting plate 304 using explosive or hot roll cladding techniques. The resulting bimetallic sandwich may then be machined to remove the aluminum structural material and ferromagnetic material as needed. The machined piece may then have the ferromagnetic target 312 aluminum clad using cold-spraying or electroplating, and then may have that surface anodized for increased durability.

The ferromagnetic target 312 may include a soft magnetic material having high permeability, high saturation magnetization, and low coercive force. These properties enable robust magnetic attraction with a high holding force while ensuring that the electropermanent magnet 208 has a low residual magnetic field that doesn't interfere with components of the first object 104. The coercive force may affect torque created by the Earth's magnetic field, but the larger the spacecraft the more torque it takes to induce a given angular acceleration. Other items on a spacecraft may induce magnetic dipoles (e.g., ferrous material in magnetorquers or hall thrusters, current loops caused by how the electronics and harnessing are designed, etc), so generally it is preferred to maintain a low worst-case residual dipole. In one embodiment, a rigid ring 320 may be used to secure the ferromagnetic target 312 to the mounting plate 304.

Referring now to FIG. 3B, a diagram illustrating an exploded view of the first interface portion 116 in accordance with embodiments of the present invention is shown. FIG. 3B shows the components of the first interface portion 116 of FIG. 3A in a separated exploded view to provide more detail for an example of assembly. Visible in FIG. 3B are a number of fasteners 334 to secure the ring 320 to the mounting plate 304. In the illustrated embodiment, there are eight fasteners 334 shown, although any number of fasteners 334 may be used. In one embodiment, no fasteners 334 may be required if the ring 320 is secured by soldering, brazing, gluing, or other fastener-less process. FIG. 3B also shows four mounting holes for the mounting plate 304, one in each corner. However, any number of mounting holes may be used.

FIG. 3B also shows a hexagonal channel at the center rear of the mounting plate 304, and a matching hexagonal feature on the fluid connector first portion 308. This provides an anti-rotation feature that prevents the fluid connector first portion 308 from rotating within the mounting plate 304. Other forms of anti-rotation features may be equivalently used, including a splined shaft, square interfaces, and the like.

Referring now to FIG. 3C, a diagram illustrating a sectional view A-A of the first interface portion 116 in accordance with embodiments of the present invention is shown. FIG. 3C provides a section view A-A of the first interface portion 116, referenced to FIG. 3A.

The first interface portion 116 includes the fluid connector first portion 308, the mounting plate 304, and the ferromagnetic target 312. A fluid pathway 354A proceeds through the center of the fluid connector first portion 308, along its entire length. A coupling to the fluid reservoir 358 may be provided on a back side (i.e. within the first object 104, when installed). The fluid pathway 354A extends from the first portion sealing surface 316 to a rear surface of the coupling to fluid reservoir 358. In one embodiment, there may be one or more check valves or poppet valves within the fluid pathway 354A, although there may be valves between the coupling to fluid reservoir 358 and the fluid reservoir 140.

In one embodiment, there may be a threaded interface on the coupling to fluid reservoir 358. This may allow a threaded hose to be attached to the coupling to fluid reservoir 358. In other embodiments, there may be a soldered, brazed, or other type of connection to tubing or a hose to the fluid reservoir 140.

Referring now to FIG. 4A, a diagram illustrating an isometric view of a second interface portion 120 in accordance with embodiments of the present invention is shown. The second interface portion 120 couples to and mates with the first interface portion 116. The second interface portion 120 includes most of the active components of the fluid transfer interface, and is intended to be the movable portion of the interface while the first interface portion 116 is static. As such, in one embodiment the second interface portion 120 may be attached to a robotic manipulator 112 or other form of movable member.

Structurally, the second interface portion 120 is made up of three components: a base 404, a mounting frame 408, and a number of linear guides 420. The base 404 is located at the rear of the second interface portion 120 (i.e. the end of the interface 420 away from the first interface portion 116). The mounting frame 408 is located at the front of the second interface portion 120 (i.e. the end of the interface 420 facing toward the first interface portion 116). The linear guides 420 are generally axially distributed around the center of the second interface portion 120, and between the base 404 and the mounting frame 408. When assembled, the base 404/linear guides 420/mounting frame 408 make up a partially collapsible assembly that extends to a maximum length and retracts to a minimum length, and supports the other components of the second interface portion 120. In one embodiment, the base 404/linear guides 420/mounting frame 408 may be constructed of a rigid material, including a rigid metallic material such as stainless steel or aluminum.

In one embodiment, the linear guides 420 may be organized into a group of lengthwise pairs, evenly distributed around the center of the second interface portion 120. Each pair of linear guides 420 may include one guide attached to a front surface of the base 404 and another guide attached to a rear surface of the mounting frame 408. The guides 420 within each pair are intended to stay in contact and slide lengthwise in order to maintain axial alignment of the second interface portion 120 as it expands or retracts. In other embodiments, other forms of linear guides 420 may be utilized without deviating from the scope of the present application. For example, linear guides 420 may include one or more guide rods, linear bearings, or bushings.

A fluid connector second portion 412 is rigidly attached to the base 404, with a coupling to the fluid reservoir 416 at the rear end of the second interface portion 120. The fluid connector second portion 412 is therefore movable toward the front of the second interface portion 120 (i.e. toward the mounting frame 408) as the second interface portion 120 retracts, as previously described. The fluid connector second portion 412 may include one or more face seals 428 or radial seals (not shown) in order to provide a leak proof fluid transfer interface when coupled.

The second interface portion 120 may also include one or more linear actuators 424, evenly distributed around the center of the second interface portion 120. The linear actuators 424 are externally activated on command, and control the degree to which the second interface portion 120 is expanded or retracted, and maintain that degree of expansion or retraction when inactivated. Controlling the linear actuators 424 is explained in the context of a fluid transfer interface coupling process in FIG. 7, and a fluid transfer interface decoupling process in FIG. 8. The linear actuators 424 may include one or more motors, solenoids, thermohydraulic actuators such as high-output paraffin actuators, or other form of controllable active components. In one embodiment, a computer or individual associated with the second object 108 may control the linear actuators 424.

The mounting frame 408 supports one or more electropermanent magnets 208. The embodiment shown in FIG. 4A includes six electropermanent magnet elements 208. The electropermanent magnet elements 208 secure the second interface portion 120 to the first interface portion 116 by providing a strong attraction force to the ferromagnetic target 312 when magnetized. This attraction force maintains coupling in the fluid transfer interface while fluid is transferred between the fluid reservoirs 124, 140. In one embodiment, a computer or individual associated with the second object 108 may control the electropermanent magnet elements 208. In one embodiment, a same computer or individual associated with the linear actuators 424 may also control the electropermanent magnet elements 208. In another embodiment, a same computer or individual associated with the robotic manipulator 112 may also control the linear actuators 424 and/or the electropermanent magnet elements 208. In one embodiment, the linear actuators 424 may be configured so that power is required to retract the fluid connector 412 relative to the EPMs 208, but that if power is removed the linear actuators 424 may naturally pull the EPMs 208 and linear actuators 424 together.

In one embodiment, the second interface portion 120 includes one or more linear actuators 424, concentrically disposed around the second portion of the fluid connector 412, configured to axially extend or retract the second portion of the fluid connector 412 relative to the second interface portion 120.

In one embodiment, the second interface portion 120 includes one or more linear guides 420, disposed around and parallel to the second portion of the fluid connector 412, configured to maintain axial alignment between the first 308 and second 412 portions of the fluid connector while the second portion of the fluid connector 412 is extended toward the first portion of the fluid connector 308.

Referring now to FIG. 4B, a diagram illustrating an exploded view of the second interface portion 120 in accordance with embodiments of the present invention is shown. FIG. 4B shows the components of the second interface portion 120 of FIG. 4A in a separated exploded view to provide more detail for an example of assembly.

FIG. 4B shows a coupling 416 to the fluid transfer reservoir 124 at the rear of the fluid connector second portion 412. This coupling 416 passes through a hole in the center of the base 404. In one embodiment, there may be a threaded interface on the coupling to fluid reservoir 124. This may allow a threaded hose to be attached to the coupling to fluid reservoir 124. Such a hose may pass along/through various movable members of the robotic manipulator 112 and into the second object 108, where it is then routed to the fluid reservoir 124. In other embodiments, there may be a soldered, brazed, or other type of connection to tubing or a hose to the fluid reservoir 124.

The second interface portion 120 may include one or more springs 432, which may be laterally disposed around the second portion of the fluid connector 412. The springs(s) 432 are configured to provide axial tolerance between a bearing surface of the second interface portion 120 and the second portion of the fluid connector 412.

FIG. 4B also shows a hexagonal channel at the center of the base 404, and a matching hexagonal feature on the fluid connector second portion 412. This provides an anti-rotation feature that prevents the fluid connector second portion 412 from rotating within the base 404. Other forms of anti-rotation features may be equivalently used, including a splined shaft, square interfaces, and the like.

In one embodiment, the second interface portion 120 includes one or more springs 432, laterally disposed around the second portion of the fluid connector 412, configured to provide axial tolerance between a bearing surface 404 of the second interface portion 120 and the second portion of the fluid connector 412.

Referring now to FIG. 4C, a diagram illustrating a side view of the second interface portion 120 in accordance with embodiments of the present invention is shown. The side view shown in FIG. 4C shows the second interface portion 120 when in the uncoupled position, where there is a maximum distance between the base 404 and the mounting frame 408. The linear actuators 424 have been set to fully retract the fluid connector second portion 412, and the linear guides 420 only overlap by a small amount.

Referring now to FIG. 4D, a diagram illustrating a sectional view B-B of the second interface portion 120 in accordance with embodiments of the present invention is shown. The sectional view B-B corresponds to the section lines B-B shown in FIG. 4A.

The fluid connector second portion 412 includes a fluid pathway 354B, which linearly extends lengthwise through the center of the fluid connector second portion 412. When coupled to the fluid connector first portion 308, a continuous fluid pathway 354 is present, with the optional exception of the presence of any check valves or poppet valves 436 in the first 308 and/or second 412 connector portions. FIG. 4D shows a poppet valve 436 within the fluid pathway 354B. Poppet valves 436 include a plunger that can make contact with a face portion of the first connector portion 308. When the fluid connector second portion 412 is not in contact with the fluid connector first portion 308, the plunger is not depressed and the valve 436 blocks fluid flow through the fluid pathway 354B. When the fluid connector second portion 412 is in contact with the fluid connector first portion 308, the plunger is depressed and the valve 436 allows fluid flow through the fluid pathway 354B, 354A. Although a poppet valve 436 is shown and described, it should be understand that any type of fluid control valve 436 may be present, including no valve 436.

Also present in FIG. 4D is a flanged ring 444. The flanged ring 444 is seated within the center of the mounting frame 408, and provides a soft lead-in to the fluid connector first portion 308 during coupling operations. The flanged ring 444 may include angled sides on an inner surface that axially center the fluid interface first 116 and second 120 portions. In a preferred embodiment, the flanged ring 444 may be made from a smooth and resilient material such as various plastics/polymers that have some give and reduce the chance of nicks or gouges in other parts of the fluid transfer interface 116, 120.

Also shown in FIG. 4D is a face seal 428 in the mating surface of the fluid connector second portion 412. The face seal 428 is intended to make contact with a face portion of the fluid connector first portion 308, which commonly would not have a face seal present. FIG. 4D also shows a radial seal 440, which may be installed around a circumference of the fluid connector second portion 412. The face seal 428 and radial seal 440 prevent fluid leakage during fluid transfer operations, and may be present in either the first 116 or second 120 interface portions. In one embodiment, in lieu of a radial seal 440, a welded metallic bellows may be used.

In one embodiment, the second interface portion 120 includes a ring of resilient material 444, concentric with the second portion of the fluid connector 412 and comprising a hole for the first portion of the fluid connector 308 to pass therethrough. The ring of resilient material 444, or flanged ring 444, may include a flanged lead-in on an inner surface.

Referring now to FIG. 5A, a diagram illustrating an isometric view of an uncoupled fluid transfer interface 500 in accordance with embodiments of the present invention is shown. FIG. 5A illustrates a stage in the coupling process where rough axial alignment has been performed between the first 116 and second 120 interface portions. The second interface portion 120 is moving axially toward the first interface portion 116, and the fluid connector first portion 308 is approaching the flanged ring 444. At this point, the electropermanent magnets 208 have not been magnetized and the linear actuators 424 have not yet been activated to bring the base 404 closer to the mounting frame 408.

Referring now to FIG. 5B, a diagram illustrating a sectional view C-C of the uncoupled fluid transfer interface 520 in accordance with embodiments of the present invention is shown. The sectional view C-C corresponds to the section lines C-C shown in FIG. 5A. The fluid connector first portion 308 is approaching passing through the flanged ring 444. The lead-in on the flanged ring 444 will assist in centering and aligning the fluid connector first portion 308 with the fluid connector second portion 412. The second portion of the fluid transfer interface 120 continues to move toward the first portion of the fluid transfer interface 116.

Referring now to FIG. 6A, a diagram illustrating an isometric view of a coupled fluid transfer interface 600 in accordance with embodiments of the present invention is shown. At the point shown, the second portion of the fluid transfer interface 120 is coupled to the first portion of the fluid transfer interface 116, and fluid transfer may be performed. Prior to this point, the second portion 120 was moved toward the first portion 116 until they were in contact with each other. Once the electropermanent magnets 208 of the second interface portion 120 make contact with the ferromagnetic target 312 of the first interface portion 116, the electropermanent magnets 208 are magnetized and hold the second interface portion 120 firmly to the first interface portion 116.

At this point, the linear actuators 424 are activated, bringing the fluid connector second portion 412 into contact with the fluid connector first portion 308. Once the fluid connector first portion 308 makes contact with the fluid connector second portion 412 (or, the fluid connector first portion 308 makes contact with a face seal 428 of the fluid connector second portion 412 or, a face seal 428 of the fluid connector first portion 308 makes contact with the fluid connector second portion 412), the valve 436 opens up to allow fluid transfer. One or more additional valves associated with the first 104 and/or second 108 object may be opened up, if present, to allow fluid transfer between the fluid reservoirs 124, 140.

In one embodiment, a fluid transfer interface 600 is provided. The fluid transfer interface 600 includes a first interface portion 116, which includes a first portion of a fluid connector 308, centrally disposed within the first interface portion 116 and configured to allow a fluid to pass therethrough and one or more ferromagnetic surfaces 312, laterally disposed around the first portion of the fluid connector 308. The fluid transfer interface 600 also includes a second interface portion 120, which includes an extendable second portion of the fluid connector 412, centrally disposed within the second interface portion 120 and configured to allow the fluid to pass therethrough to the first portion of the fluid connector 308 in response to the first portion of the fluid connector 308 is coupled to the second portion of the fluid connector 412 and one or more electropermanent magnets 208, laterally disposed around the second portion of the fluid connector 412, configured to be magnetized or demagnetized in unison. The one or more electropermanent magnets 208 are further configured to provide attraction force to the one or more ferromagnetic surfaces 312 when magnetized and couple the first interface portion 116 to the second interface portion 120 and provide no attraction force to the one or more ferromagnetic surfaces 312 when demagnetized and allow the first interface portion 116 to be decoupled from the second interface portion 120.

In some embodiments, some form of positive or negative pressurization of fluid may be desired or required. However, pressurization is outside the scope of the present application, and may be associated with the first 104 and/or second 108 objects.

Referring now to FIG. 6B, a diagram illustrating a sectional view D-D of the coupled fluid transfer interface 620 in accordance with embodiments of the present invention is shown. The sectional view D-D corresponds to the section lines D-D shown in FIG. 6A. FIG. 6B illustrates the fully coupled interface 116, 120. The electropermanent magnets 208 are in direct contact with the ferromagnetic target 312 and the fluid connector second portion 412 is in direct contact with the fluid connector first portion 308. The valve 436 is open, and fluid pathway 354B is able to transfer fluid to fluid pathway 354A, and vice versa.

In one embodiment, the fluid transfer interface 600 may include one or more valves 436, configured to close and prevent fluid flow in response to the first portion of the fluid connector 308 is not coupled to the second portion of the fluid connector 412 and open and allow fluid flow in response to the first portion of the fluid connector 308 is coupled to the second portion of the fluid connector 412. In one embodiment, valves 436 may be present both in the first portion interface 116 as well as the second portion interface 120. This may allow a dual shutoff style quick disconnect interface.

Referring now to FIG. 7, a flowchart illustrating a fluid transfer interface coupling process 700 in accordance with embodiments of the present invention is shown. FIG. 7 describes a mating or coupling process between the first 116 and second 120 fluid interface portions. Flow begins at block 704.

At block 704, the second portion of the fluid transfer interface 120 is maneuvered into approximate angular and axial alignment with the first portion of the fluid transfer interface 116. In one embodiment, a robotic manipulator 112 may be attached to the second portion of the interface 120 and have one or more degrees of freedom. In another embodiment, a posable hose (FIG. 9A/9B) may be attached to the second portion of the interface 120. Flow proceeds to block 708.

At block 708, the second portion of the interface 120 is axially extended toward the first portion of the interface 116. At this point, the movement is caused by outside members or devices, such as the robotic manipulator 112, the posable hose 900, or movement of the second object 108. Flow proceeds to block 712.

At block 712, the fluid connector first portion 308 passes through a flanged ring 444 of the second interface portion 120. The flanged ring 444 provides smooth lead-in to help the first 116 and second 120 portions of the interface become centered and axially oriented. Flow proceeds to block 716.

At block 716, electropermanent magnet elements 208 of the second interface portion 120 make contact with the ferromagnetic target 312 of the first interface portion 116. Flow proceeds to block 720.

At block 720, the electropermanent magnet elements 208 are magnetized. In one embodiment, the control circuit 204 and associated components may be part of the second interface portion 120. In another embodiment, the control circuit 204 and associated components may be part of the robotic manipulator 112, the posable hose 900, or the second object 108. Flow proceeds to block 724.

At block 724, the electropermanent magnet elements 208 provide attraction grip force to the ferromagnetic target 312. Once magnetized, the electropermanent magnet elements 208 are attracted to the ferromagnetic target 312 and rigidly couple the second portion interface 120 to the first portion interface 116. Flow proceeds to block 728.

At block 728, the linear actuators 424 in the second interface portion 120 are activated. Activated means the linear actuators 424 are energized in such a way as to move the base 404 closer to the mounting frame 408. In one embodiment, the linear actuators 424 have a minimum or maximum travel distance such that when activated, the linear actuators 424 move to the minimum or maximum travel distance and cause the fluid connector second portion 412 to move into direct contact with the fluid connector first portion 308.

In one embodiment, coupling or mating the second portion of the fluid connector 412 to the first portion of the fluid connector 308 includes energizing one or more linear actuators 424 of the second interface portion 120 to extend the second portion of the fluid connector 412 relative to the second interface portion 120, toward the first portion of the fluid connector 308, and pressing one or more sealing surfaces of one or more of the first 308 and second 412 fluid connector portions against one or more seals 428, 440 of the other of the one or more of the first 308 and second 412 fluid connector portions. Flow proceeds to block 732.

At block 732, the fluid connector second portion 412 couples to the fluid connector first portion 308. The fluid connector second portion 412 moves into direct contact with the fluid connector first portion 308. Flow proceeds to block 736.

At block 736, one or more valves 436 in the fluid transfer interface 116, 120 open up during coupling. In one embodiment, a poppet valve in the fluid connector second portion 412 automatically opens when the fluid connector second portion 412 makes contact with the fluid connector first portion 308. In other embodiments, a valve 436 may be manually opened or closed by a computer or individual associated with the first 104 or second 108 objects.

In one embodiment, coupling or mating the second portion of the fluid connector 412 to the first portion of the fluid connector 308 includes opening a valve 436 in one or more of the first 308 or second 412 portions of the fluid connector. The valve 426 is configured to close and prevent fluid flow in response to the first portion of the fluid connector 308 is not coupled to the second portion of the fluid connector 412 and open and allow fluid flow in response to the first portion of the fluid connector 308 is coupled to the second portion of the fluid connector 412.

In one embodiment, enabling the fluid to pass between the second portion of the fluid connector 412 and the first portion of the fluid connector 308 includes wherein mating the first 308 and second 412 portions of the fluid connector cause one or more valves 436 of the first 308 and second 412 vportions of the fluid connector to transition from a closed position to an open position, blocking fluid transfer when in the closed position and allowing fluid transfer when in the open position. Flow proceeds to block 740.

At block 740, opening the one or more valves 436 causes the fluid transfer pathway 354A, 354B to enable fluid transfer between the first 116 and the second 120 interface portions. However, there may be additional valves to be opened in the first 116 and/or second 120 interface portions—such as valves associated with the fluid reservoirs 124, 140. In one embodiment, one or more valves in the fluid-supplying object may be opened to enable fluid transfer. That is, for a fluid transfer from the second object 108 to the first object 104, one or more valves in the second object 108 may be opened. Conversely, for a fluid transfer from the first object 104 to the second object 106, one or more valves in the first object 104 may be opened. Flow proceeds to block 744.

At block 744, fluid flows through the coupled interface 116, 120 to a fluid-receiving object. This allows a fluid transfer between fluid reservoirs 124 and 140. Flow proceeds to decision block 748.

At decision block 748, a determination is made if the fluid transfer is completed. If the fluid transfer is not completed, then flow proceeds to decision block 748 to continue evaluation. If the fluid transfer is completed, then flow proceeds to block 752.

At block 752, the fluid transfer pathway 354 is closed. This involves closing the one or more valves associated with the first 104 and/or second 108 objects, and is the opposite of the step recited in block 740. In one embodiment, one or more valves in the fluid-supplying object may be closed to enable fluid transfer. That is, for a fluid transfer from the second object 108 to the first object 104, one or more valves in the second object 108 may be closed. Conversely, for a fluid transfer from the first object 104 to the second object 106, one or more valves in the first object 104 may be closed. Flow proceeds to block 756.

At block 756, fluid stops flowing through the coupled interface 116, 120. At this point, the decoupling process described in FIG. 8 may be performed. Flow ends at block 756.

In one embodiment, a method of the present application includes maneuvering a second interface portion 120 of a fluid transfer interface 600 into approximate angular and axial alignment with a first interface portion 116 of the fluid transfer interface 600, axially extending the second interface portion 120 toward the first interface portion 116, and establishing contact between an electropermanent magnet ring 208 of the second interface portion 120 and a ferromagnetic target 312 of the first interface portion 116. In response to establishing contact, the method includes changing the electropermanent magnet ring 208 from a demagnetized state to a magnetized state, mating the second portion of the fluid connector 412 to the first portion of the fluid connector 308, and enabling a fluid to pass between the second portion of the fluid connector 412 and the first portion of the fluid connector 308. The first interface portion 116 includes a first portion of a fluid connector 308 and the second interface portion 120 includes a second portion of the fluid connector 412, and the fluid connector 308/412 is configured to allow a fluid to pass therethrough.

Referring now to FIG. 8, a flowchart illustrating a fluid transfer interface decoupling process 800 in accordance with embodiments of the present invention is shown. The decoupling process of FIG. 8 reverses the coupling process described in FIG. 7. Flow begins at block 804.

At block 804, the fluid transfer pathway 354 is closed. This step refers to closing one or more valves associated with either the first object 104 and/or the second object 108, and not valves 436 of the first 116 and/or second 120 interface portions. Flow proceeds to block 808.

At block 808, fluid stops flowing through the coupled interface 116, 120, and no more fluid transfer may occur. Flow proceeds to block 812.

At clock 812, one or more linear actuators 424 of the second interface portion 120 are deactivated. Deactivated means the linear actuators 424 are de-energized in such a way as to move the base 404 away from the mounting frame 408. In one embodiment, the linear actuators 424 have a minimum or maximum travel distance such that when deactivated, the linear actuators 424 move to the minimum or maximum travel distance and cause the fluid connector second portion 412 to away from direct contact with the fluid connector first portion 308. Flow proceeds to block 816.

At block 816, the fluid connector second portion 412 uncouples from the fluid connector first portion 308. The fluid connector second portion 412 moves away from contact with the fluid connector first portion 308. Flow proceeds to block 820.

At block 820, the electropermanent magnet elements 208 are demagnetized. Demagnetization involves energizing the electropermanent magnet elements 208 with a successive pattern of alternating polarity current pulses with successively decreasing amplitude. In one embodiment, the control circuit 204 and associated components may be part of the second interface portion 120. In another embodiment, the control circuit 204 and associated components may be part of the robotic manipulator 112, the posable hose 900, or the second object 108. Flow proceeds to block 824.

At block 824, the electropermanent magnet elements 208 stop providing attraction grip force to the ferromagnetic target 312. Once demagnetized, the electropermanent magnet elements 208 are no longer attracted to the ferromagnetic target 312 and no longer couple the second portion interface 120 to the first portion interface 116. Flow proceeds to block 828.

At block 828, the electropermanent magnet elements 208 of the second portion interface 120 move away from the ferromagnetic target 312. With the electropermanent magnets 208 now deactivated, there is no force holding the second interface portion 120 to the first interface portion 116, and the robotic manipulator 112, portion interface 120 to the first portion interface 116, and the second object 108 may initiate separation movement. Flow proceeds to block 832.

At block 832, the fluid connector first portion 308 passes through the flanged ring 444 of the second interface portion 120. The flanged ring 444 provides smooth lead-in to help the first 116 and second 120 portions of the interface become centered and axially oriented. Flow proceeds to block 836.

At block 836, the second portion of the interface 120 is axially retracted away from the first portion of the interface 116. At this point, the movement is caused by outside members or devices, such as the robotic manipulator 112, the posable hose 900, or movement of the second object 108. Flow proceeds to block 840.

At block 840, the second portion of the interface 120 is maneuvered away from angular and axial alignment with the first portion of the fluid transfer interface 116. In one embodiment, a robotic manipulator 112 may be attached to the second portion of the interface 120 and have one or more degrees of freedom. In another embodiment, a posable hose 900 may be attached to the second portion of the interface 120. Flow ends at block 840.

In one embodiment, determining a fluid transfer operation is completed includes inhibiting providing fluid between the first 116 and second 120 interface portions, unmating the second portion of the fluid connector 412 from the first portion of the fluid connector 308, changing the electropermanent magnet ring from a magnetized state to a demagnetized state, and axially retracting the second interface portion 120 away from the first interface portion 116.

In one embodiment, unmating the second portion of the fluid connector 412 from the first portion of the fluid connector 308 includes energizing one or more linear actuators 424 of the second interface portion 120 to retract the second portion of the fluid connector 412 relative to the second interface portion 120 and moving one or more sealing surfaces of the one or more of the first 308 and second 412 fluid connector portions away from contact with the other of the one or more of the first 308 and second 412 fluid connector portions.

Referring now to FIG. 9A, a diagram illustrating a side view of a posable hose 900, in accordance with embodiments of the present invention is shown. The posable hose 900 provides an alternate support structure for fluid transfer couplings between the second object 108 and the first object 104. The posable hose 900 may provide five degrees of freedom (i.e., roll, pitch, and yaw—with each wrist joint providing separate pitch and yaw) when inactivated to allow spatial flexibility during coupling operations.

In the preferred embodiment, each end of the posable hose 900 may include a second interface portion 120. When configured in this way, each of the first 104 and second 108 objects would require a first interface portion 116 to be affixed thereon. FIG. 9A shows one end of the posable hose 900 including a second interface portion 120A and an opposite end including a second interface portion 120B. In other embodiments, one or both ends of the posable hose 900 may include a first interface portion 116.

The posable hose 900 may have three joints: a wrist joint 928A at one end, a wrist joint 928B at the opposite end, and an elbow joint 916 between the wrist joints 928A, 928B. A hinge may be provided to allow rotation around each axis. Joints providing a single degree of freedom 954 may only require a single hinge, while joints requiring two degrees of freedom 958 may require two hinges, and so forth. In one embodiment, the elbow joint 916 may be located at a midpoint between the wrist joints 928. In another embodiment, the elbow joint 916 may be located closer to one of the two wrist joints 928. In one embodiment, the elbow joint 916 may be articulated with a single degree of freedom to allow shortening (i.e. where wrist joint 928A is closer to wrist joint 928B) or lengthening (i.e. where wrist joint 928A is further from wrist joint 928B). Other forms of articulation may be possible, including multiple degrees of freedom and fewer or more joints than three joints. In one embodiment, the posable hose 900 may have more or fewer elbow joints 916 than shown.

In one embodiment, each wrist joint 928 may be articulated with two degrees of freedom. The provided articulation allows for axial alignment between the first 116 and second 120 interface portions prior to coupling. In other embodiments, each wrist joint 928 may be articulated with other than two degrees of freedom. In other embodiments, each wrist joint 928 may be articulated with a different number of degrees of freedom. For example, one end of the posable hose 900 may be semi-permanently coupled to the second object 108 and not require any degrees of freedom for articulation. It may be possible to arrange the opposite end wrist joint 928 and the elbow joint 916 in such a way as to store the posable hose 900 in a more compact form when not in use.

The posable hose 900 may include fluid transfer pathways to facilitate fluid transfers between the two ends. In one embodiment, each of the joint sections 916, 928A, 928B may be connected by a section of rigid tubing 904. FIG. 9A shows rigid tubing section 904A between wrist joint 928A and one end of the elbow joint 916, and rigid tubing section 904B between wrist joint 928B and a second end of the elbow joint 916. Within each of the wrist joints 928 and elbow joint(s) 916 is a flexible hose 908 (see FIG. 9B). Within wrist joint 928A, flexible hose 908A may connect rigid tubing 904A with second interface portion 120A. Within elbow joint 916, flexible hose 908B may connect rigid tubing 904A with rigid tubing 904B. Within wrist joint 928B, flexible hose 908C may connect rigid tubing 904B with second interface portion 120B. Flexible hose sections 908 are intended to follow the motion of each supported joint area. Flexible hose sections 908 may be joined to the rigid tubes 904 using any known arrangement or method, including threaded fluid fittings, welded joints, or brazed joints.

The posable hose 900 may also include one or more grapple points 912, 924. Grapple points 912, 924 may allow robotic manipulator 112 or other control devices to latch onto the posable hose 900 at useful attachment points to control the posable hose 900 in order to facilitate attachment to the first 104 or second 108 objects or to store the posable hose 900. FIG. 9A illustrates two grapple points 924 on the wrist joints and two grapple points on the elbow joint 916. Wrist grapple point 924A is on an outside surface of wrist joint 928A, and wrist grapple point 924B is on an outside surface of wrist joint 928B. Elbow grapple point 912A is on a left side of elbow joint 916, and elbow grapple point 912B is on a right side of elbow joint 916. Different arrangements and locations of grapple points 912, 924 are possible without deviating from the scope of the application.

Key to operation of the posable hose 900, and allowing it to be "posable" are friction brakes 920 associated with each of the hinges. Friction brakes 920, when not activated, provide no control of hinge movement. When activated, friction brakes 920 become rigid and do not allow hinge movement. This effectively "freezes" the posable hose 900 in position and makes the entire structure rigid between the first 104 and second 108 objects. FIG. 9A illustrates friction brake 920A at the elbow joint 916 hinge. Other friction brakes 920 will be described in FIG. 9B.

Referring now to FIG. 9B, a diagram illustrating an orthogonal view 950 of a posable hose 900, in accordance with embodiments of the present invention is shown. FIG. 9B illustrates a posable hose 900 with a partially open elbow joint 916 and each of the wrist joints 928A, 928B. This may reflect a disposition where the first object 104 is close to the second object 108 and the first interface portions 116 are approximately 120 degrees apart. FIG. 9B shows more detail for the friction brakes 920 at each wrist joint 928. Wrist joint 928A includes friction brake 920B, which may control side-to-side movement, and friction brake 920C, which may control up-down movement. Wrist joint 928B includes friction brake 920E, which may control side-to-side movement, and friction brake 920D, which may control up-down movement. Other arrangements and locations for friction brakes 920 may be utilized without deviating from the scope of the present application.

Referring now to FIG. 10, a block diagram of a posable hose 1000, in accordance with embodiments of the present invention is shown. FIG. 10 illustrates exemplary active components of a representative posable hose 900, and corresponds to the embodiment illustrated in FIGS. 9A/9B. The active components may include wrist #1 active components 1016, an elbow brake 920A, and wrist #2 active components 1020. The wrist #1 active components 1016 may include wrist #1 linear actuators 424A, wrist #1 EPM modules 208M, a wrist #1 pitch brake 920C, and a wrist #1 yaw brake 920B. The wrist #2 active components 1020 may include wrist #2 linear actuators 424B, wrist #2 EPM modules 208N, a wrist #2 pitch brake 920D, and a wrist #2 yaw brake 920E.

Posable hose 900 may be controlled by a spacecraft 1004, which may be a first object 104 or second object 108 as described herein. The spacecraft 1004 may provide one or more control signals 1008 and power 1012 in order to control the positioning and operation of the posable hose 900. In one embodiment, the spacecraft 1004 may provide the control signals 1008 and power 1012 through a grapple point 912, 924. That is, not only is a grapple point 912, 924 a mechanical fastening point for a robotic manipulator 112 or other control apparatus, but it also may provide an interface for the control signals 1008 and power 1012 to reach active components within the posable hose 900. In other embodiments, one or more of control signals 1008 and/or power 1012 may be wirelessly provided to the posable hose 900.

Although a single power connection 1012 is shown, it should be generally understood that power 1012 may represent separate power connections to each active component. Some active components may require both control signals 1008 and power 1012, while other active components may require only power 1012. For example, friction brakes 920 may require only a power connection 920 while each of the linear actuators 424 and EPM modules 208 may require both control signals 1008 and power 1012. It should also be understood that linear actuators 424 (i.e., 424A/424B) and EPM modules 208 (i.e. 208M/208N) may represent any number of actuators 424/modules 208 and each of the actuators 424/modules 208 may require separate control signals 1008 and power 1012.

Referring now to FIG. 11A, a diagram illustrating object capture 1100, in accordance with embodiments of the present invention is shown. FIG. 11A shows a first in a series of operations for transferring one or more fluids between a propellant depot 1104 and a spacecraft 1108. The propellant depot 1104 may be a specialized form of spacecraft that is able to supply one or more propellants or fluids to other spacecraft, including satellites. The propellant depot 1104 may store multiple types of fluids, including cryogenic propellants, water, lubricants, and the like. Because the propellant depot 1104 primarily sources fluids for transfer to other spacecraft, the propellant deport is considered a second object 108 while the receiving spacecraft 1108 is a first object 104, as explained previously.

In the illustrated example, the propellant depot 1104 includes three fluid reservoirs 124, identified as fluid reservoirs 124A-124C. In the illustrated example, the spacecraft 1108 includes two fluid reservoirs 140, identified as fluid reservoirs 140A-140B. In one embodiment, one or more fluid reservoirs 124 may contain a same type of fluid. In other embodiments, one or more fluid reservoirs 124 may contain a different type of fluid. Although three fluid reservoirs 124A-124C are shown, it should be understood that any number of fluid reservoirs 124, 140 may be present in a first object 104, a second object 108, a propellant depot 1104, and/or a spacecraft 1108. In the illustrated example, the propellant depot 1104 includes two fluid transfer couplings 1112 and the spacecraft 1108 includes two fluid transfer couplings 1112. In other embodiments, there may be any number of fluid transfer couplings on the first 104 or second 108 objects.

In the illustrated example, the propellant depot 1104 includes two berthing capture arms 1116, identified as berthing capture arm 1116A and berthing capture arm 1116B. Berthing capture arms 1116 secure the propellant depot 1104/second object 108 to the spacecraft 1108/first object 104. FIG. 11A shows each of the berthing capture arms 1116A/1116B moving toward the spacecraft 1120A/1120B. Prior to this operation, the propellant depot 1104 and/or spacecraft 1108 has moved within a capture distance and orientation of the spacecraft 1108. The propellant depot 1104 may also include one or more robotic manipulators 112, which are described with reference to the following figures.

Referring now to FIG. 11B, a diagram illustrating posable hose preparation 1130, in accordance with embodiments of the present invention is shown. FIG. 11B shows each of the berthing capture arms securing the spacecraft 1124A/1124B. At this point, the propellant depot 1104 is rigidly attached to the spacecraft 1108. FIG. 11B also shows a robotic manipulator 112 of the propellant depot 1104 grasping a posable hose 900A. In one embodiment, the robotic manipulator 112 may grasp the posable hose 900A at an elbow grapple point 912 or a wrist grapple point 924. FIG. 11B shows the robotic manipulator 112 grasping the posable hose 900A at elbow grapple point 912B. Prior to this, the posable hose 900A may have been secured to an exterior surface of the propellant depot 1104 or stored within the propellant depot 1104, and retrieved by the robotic manipulator 112.

Referring now to FIG. 11C, a diagram illustrating a first posable hose installation 1150, in accordance with embodiments of the present invention is shown. FIG. 11C shows the first posable hose 900A installed between fluid couplings 1112 on the propellant depot 1104 and the spacecraft 1008. Fluid flows 1154 from fluid reservoir 124A to fluid reservoir 140A. The fluid level in fluid reservoir 124A is reduced compared to the level shown in FIGS. 11A/11B, and the fluid level in fluid reservoir 140A is now full. Finally, the robotic manipulator 112 has retrieved another posable hose 900B in preparation for installation. This time, the robotic manipulator 112 grasps posable hose 900B by wrist grapple point 924B instead of an elbow grapple point 912.

Referring now to FIG. 11D, a diagram illustrating a second posable hose installation 1170, in accordance with embodiments of the present invention is shown. FIG. 11D shows the second posable hose 900B installed between fluid couplings 1112 on the propellant depot 1104 and the spacecraft 1008. Fluid flows 1174 from fluid reservoir 124B to fluid reservoir 140B. The fluid level in fluid reservoir 124B is reduced compared to the level shown in FIGS. 11A/11B, and the fluid level in fluid reservoir 140B is now full. In one embodiment, the fluids stored in fluid reservoirs 124A/124B/140A/140B are all the same, while in another embodiment, the fluids stored in fluid reservoirs 124A/140A are the same and the fluid stored in fluid reservoirs 124B/140B are the same—but the fluid stored in fluid reservoirs 124A/140A are different than the fluid stored in fluid reservoirs 124B/140B.

Finally, those skilled in the art should appreciate that they can readily use the disclosed conception and specific embodiments as a basis for designing or modifying other structures for carrying out the same purposes of the present application without departing from the spirit and scope of the application as defined by the appended claims.

It will be readily understood that the components of the application, as generally described and illustrated in the Figures herein, may be arranged and designed in a wide variety of different configurations. Thus, the detailed description of the embodiments is not intended to limit the scope of the application as claimed, but is merely representative of selected and exemplary embodiments of the application.

One having ordinary skill in the art will readily understand that the application as discussed above may be practiced with steps in a different order, and/or with hardware elements in configurations that are different than those which are specifically disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the present claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

We claim:

1. A fluid transfer interface, comprising:
   a first interface portion, comprising:
   a first portion of a fluid connector, centrally disposed within the first interface portion and configured to allow a fluid to pass therethrough; and
   one or more ferromagnetic surfaces, laterally disposed around the first portion of the fluid connector; and a second interface portion, comprising:
an extendable second portion of the fluid connector, centrally disposed within the second interface portion and configured to allow the fluid to pass therethrough to the first portion of the fluid connector in response to the first portion of the fluid connector being coupled to the second portion of the fluid connector;
a plurality of actuators, concentrically disposed around the second portion of the fluid connector, configured to axially extend the second portion of the fluid connector relative to the second interface portion; and
a plurality of electropermanent magnets, laterally disposed around the second portion of the fluid connector, configured to be magnetized or demagnetized in unison, further configured to:
provide attraction force to the one or more ferromagnetic surfaces when magnetized and couple the first interface portion to the second interface portion; and
provide no attraction force to the one or more ferromagnetic surfaces when demagnetized and allow the first interface portion to be decoupled from the second interface portion.

2. The fluid transfer interface of claim 1, wherein the plurality of actuators comprises a plurality of linear actuators.

3. The fluid transfer interface of claim 2, wherein the second interface portion further comprises:
one or more linear guides, disposed around and parallel to the second portion of the fluid connector, configured to maintain axial alignment between the first and second portions of the fluid connector while the second portion of the fluid connector is extended toward the first portion of the fluid connector.

4. The fluid transfer interface of claim 1, wherein the second interface portion further comprises:
one or more springs, laterally disposed around the second portion of the fluid connector, configured to provide axial tolerance between a bearing surface of the second interface portion and the second portion of the fluid connector.

5. The fluid transfer interface of claim 1, wherein the first interface portion is affixed to a first object, wherein the second interface portion is configured to be movable relative to the first interface portion and transfer the fluid between a second object coupled to the second interface portion and the first object after the first interface portion is coupled to the second interface portion.

6. The fluid transfer interface of claim 1, comprising:
a control circuit, electrically coupled to the plurality of electropermanent magnets, configured to magnetize the plurality of electropermanent magnets in response to one or more first commands, and to demagnetize the plurality of electropermanent magnets in response to one or more second commands.

7. The fluid transfer interface of claim 1, comprising:
a valve configured to close and prevent fluid flow in response to the first portion of the fluid connector not being coupled to the second portion of the fluid connector, and to open and allow fluid flow in response to the first portion of the fluid connector being coupled to the second portion of the fluid connector.

8. A method, comprising:
maneuvering a second interface portion of a fluid transfer interface into approximate angular and axial alignment with a first interface portion of the fluid transfer interface, the first interface portion comprising a first portion of a fluid connector and the second interface portion comprising a second portion of the fluid connector, the fluid connector being configured to allow a fluid to pass therethrough;
axially extending the second interface portion toward the first interface portion;
establishing contact between an electropermanent magnet ring comprising a plurality of electropermanent magnets of the second interface portion and a ferromagnetic target of the first interface portion;
in response to establishing contact:
changing the electropermanent magnet ring from a demagnetized state to a magnetized state;
energizing a plurality of actuators of the second interface portion to extend the second portion of the fluid connector relative to the second interface portion, toward the first portion of the fluid connector;
mating the second portion of the fluid connector to the first portion of the fluid connector; and
enabling a fluid to pass between the second portion of the fluid connector and the first portion of the fluid connector.

9. The method of claim 8, wherein a control circuit, electrically coupled to the electropermanent magnet ring, is configured to magnetize the electropermanent magnet ring in response to receiving one or more first commands, and to demagnetize the electropermanent magnet ring in response to receiving one or more second commands.

10. The method of claim 8, wherein mating the second portion of the fluid connector to the first portion of the fluid connector comprises:
opening a valve in one or more of the first or second portions of the fluid connector,
wherein the valve is configured to close and prevent fluid flow in response to the first portion of the fluid connector not being coupled to the second portion of the fluid connector, and to open and allow fluid flow in response to the first portion of the fluid connector being coupled to the second portion of the fluid connector.

11. The method of claim 8, wherein mating the second portion of the fluid connector to the first portion of the fluid connector comprises:
pressing one or more sealing surfaces of one or more of the first and second fluid connector portions against one or more seals of the other of the one or more of the first and second fluid connector portions, wherein the plurality of actuators comprises linear actuators.

12. The method of claim 8, wherein enabling the fluid to pass between the second portion of the fluid connector and the first portion of the fluid connector comprises:
wherein mating the first and second portions of the fluid connector causes one or more valves of the first and second portions of the fluid connector to transition from a closed position to an open position,
blocking fluid transfer when in the closed position; and
allowing fluid transfer when in the open position.

13. The method of claim 8, further comprising:
determining a fluid transfer operation is completed;
inhibiting providing fluid between the first and second interface portions;
unmating the second portion of the fluid connector from the first portion of the fluid connector;
changing the electropermanent magnet ring from a magnetized state to a demagnetized state; and
axially retracting the second interface portion away from the first interface portion.

14. The method of claim 13, wherein unmating the second portion of the fluid connector from the first portion of the fluid connector comprises:
  energizing the plurality of actuators of the second interface portion to retract the second portion of the fluid connector relative to the second interface portion; and
  moving one or more sealing surfaces of the one or more of the first and second fluid connector portions away from contact with the other of the one or more of the first and second fluid connector portions.

15. A system, comprising:
  a first object, configured to receive a fluid, comprising:
  a first interface portion, comprising:
  a first portion of a fluid connector, affixed to the first object; and
  one or more ferromagnetic surfaces, orthogonally disposed around the first portion of the fluid connector and conformal with an exterior surface of the first object;
  a second object, configured to provide the fluid;
  a second interface portion, comprising:
  a second portion of the fluid connector, the fluid connector being configured to allow the fluid to pass therethrough, and to extend with respect to the second interface portion;
  a plurality of actuators, laterally disposed around the second portion of the fluid connector, configured to axially extend the second portion of the fluid connector relative to the second interface portion; and
  a plurality of electropermanent magnets, laterally disposed around the second portion of the fluid connector, configured to be magnetized or demagnetized in unison, and further configured to:
  provide attraction force to the one or more ferromagnetic surfaces when magnetized, and to couple the first interface portion to the second interface portion; and
  provide no attraction force to the one or more ferromagnetic surfaces when demagnetized, and to allow the first interface portion to be decoupled from the second interface portion; and
  a flexible member comprising first and second ends, the first end coupled to the second object and the second end coupled to the second interface portion and the second portion of the fluid connector, and configured to maneuver the second interface portion relative to the first interface portion, and pass the fluid therethrough.

16. The system of claim 15, wherein the plurality of actuators comprises a plurality of linear actuators.

17. The system of claim 15, wherein the second interface portion further comprises:
  a control circuit, coupled to the plurality of electropermanent magnets, configured to magnetize the plurality of electropermanent magnets in response to one or more first commands, and to demagnetize the plurality of electropermanent magnets in response to one or more second commands.

18. The system of claim 15, wherein one or more of the first and second portions of the fluid connector comprises a valve configured to close and prevent fluid flow in response to the first portion of the fluid connector not being coupled to the second portion of the fluid connector, and to open and allow fluid flow in response to the first portion of the fluid connector being coupled to the second portion of the fluid connector.

19. The system of claim 15, wherein the second interface portion further comprises:
  one or more springs, laterally disposed around the second portion of the fluid connector, configured to provide axial tolerance between a bearing surface of the second interface portion and the second portion of the fluid connector.

20. The system of claim 15, wherein the second interface portion further comprises:
  a ring of resilient material, concentric with the second portion of the fluid connector and comprising a hole for the first portion of the fluid connector to pass therethrough, comprising a flanged lead-in on an inner surface.

* * * * *